(12) United States Patent
Rice et al.

(10) Patent No.: US 11,820,662 B2
(45) Date of Patent: Nov. 21, 2023

(54) PROCESS AND APPARATUS FOR CARBON NANOTUBE FORMATION

(71) Applicant: UNIVERSITY OF WYOMING, Laramie, WY (US)

(72) Inventors: William D. Rice, Laramie, WY (US); Jeffrey A. Fagan, Gaithersburg, MD (US); Joshua S. Walker, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 81 days.

(21) Appl. No.: 17/068,042

(22) Filed: Oct. 12, 2020

(65) Prior Publication Data

US 2021/0107790 A1 Apr. 15, 2021

Related U.S. Application Data

(60) Provisional application No. 62/914,512, filed on Oct. 13, 2019.

(51) Int. Cl.
*C01B 32/166* (2017.01)
*B82Y 30/00* (2011.01)
*B82Y 40/00* (2011.01)

(52) U.S. Cl.
CPC .............. *C01B 32/166* (2017.08); *B82Y 30/00* (2013.01); *B82Y 40/00* (2013.01); *C01B 2202/02* (2013.01); *C01B 2202/04* (2013.01)

(58) Field of Classification Search
CPC ..... C01B 32/158; C01B 32/159; C01B 32/16; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02;
(Continued)

(56) References Cited

PUBLICATIONS

Walker, et al., Global Alignmnet of Solution-Based Single-Wall Carbon Nanotube Films via Machine-Vision Controlled Filtration, Nano Lett. 2019; 19: 7256-7264 with Supplemental Information (Year: 2019).*

(Continued)

*Primary Examiner* — Daniel C. McCracken
(74) *Attorney, Agent, or Firm* — Patterson + Sheridan, LLP

(57) ABSTRACT

Embodiments of the present disclosure generally relate to processes and apparatus for carbon nanotube formation, and more specifically, to processes and apparatus for carbon nanotube alignment. In an embodiment, a process for aligning carbon nanotubes is provided. The process includes introducing an aqueous solution to a pressure-controlled system that includes a silanated glass element, a porous membrane, and a container. The process further includes applying a pressure differential across the porous membrane to draw the aqueous solution from the silanated glass element, through the porous membrane, and to the container at a flow rate to form a filtrate disposed within the container and a retentate disposed above the porous membrane, the retentate comprising carbon nanotubes. The process further includes optically detecting a position of a meniscus of the aqueous solution in the silanated glass element. Apparatus for forming and aligning carbon nanotubes are also disclosed.

20 Claims, 17 Drawing Sheets
(12 of 17 Drawing Sheet(s) Filed in Color)

(58) Field of Classification Search
CPC ............ C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133; B82Y 30/00; B82Y 40/00; B01D 2239/0421; B01D 2239/0478; B01D 39/1692; B01D 39/201; B01D 39/202; B01D 39/2044
See application file for complete search history.

(56) References Cited

PUBLICATIONS

He, et al., Wafer-scale monodomain films of spontaneously aligned single-walled carbon nanotubes, Nature Nanotechnology 2016; 11: 633-639 (Year: 2016).*

Walker, et al, Global Alignment of Solution-Based Single-Wall Carbon Nanotube Films via Machine-Vision Controlled Filtration, Nano Letters, 2019, 19, pp. 7256-7264.

Voit, One-dimensional Fermi Liquids, Rep. Prog. Phys. 57, 994, pp. 977-1116.

Bockrath, et al., Luttinger-Liquid Behaviour in Carbon Nanotubes, Nature, Feb. 18, 1999, 397, pp. 598-601.

Shi, et al., Observation of a Luttinger-Liquid Plasmon in Metallic Single-Walled Carbon Nanotubes, Nature Photonics, Aug. 2015, 9, pp. 515-519.

Fidkowski, et al., The Effects of Interactions on the Topological Classification of Free Fermio Systems, Phys. Rev. B 81, Apr. 7, 2010, 9 pp.

Gao, et al., Continuous transition between weak and ultrastrong coupling through exceptional points in carbon hanotube microcavity exciton-polaritons, Nature Photonics, Jun. 2018, 12, pp. 362-367.

Ho, et al., Intrinsically Ultrastrong Plasmon-Exciton Interactions in Crystallized Films of Carbon Nanotubes, PNAS, Dec. 11, 2018, 115 (50), pp. 12662-12667.

Torres, et al., Giant second-harmonic generation in a one-dimensional GaN photonic crystal, Physical Review B, Feb. 20, 2004, 69, 8 pp.

Ajiki, et al. Aharonov-Bohm Effect in Carbon Nanotubes, Physica B, 1994, pp. 349-352.

Zaric, et al., Optical Signatures of the Aharonov-Bohm Phase in Single-Walled Carbon Nanotubes, Science, May 21, 2004, 304, 5 pp.

Yanagi, et al., Intersubband plasmons in the quantum limit in gated and aligned carbon nanotubes, Nature Communications, Mar. 16, 2018, 9 (112), 7 pp.

Autes, et al., A novel quasi-one-dimensional topological insulator in bismuth iodide ?-Bi4I4, Nature Materials, Feb. 2016, 15, pp. 154-159.

Yao, et al., High-Field Electrical Transport in Single-Wall Carbon Nanotubes, Physical Review Letters, Mar. 27, 2000, 94 (13), 4 pp.

Huang, et al., Superior Current Carrying Capacity of Boron Nitride Encapsulated Carbon Nanotubes with Zerio Dimensional Contacts, Nano Letters, 2015, 15 (10), pp. 6836-6840.

Harnack, et al., Rectifying Behavior of Electrically Aligned ZnO Nanorods, 2003, 3 (8), pp. 1097-1101.

Ren, et al., Carbon Nanotube Terahertz Polarizer, Nano Letters, 2009, 9 (7), pp. 2610-2613.

He, et al., Carbon Nanotube Terahertz Detector, Nano Letters, 2014, 14, pp. 3953-3958.

Cubukcu, et al., Aligned carbon nanotubes as polarization-sensitive, molecular near-field detectors, PNAS, Feb. 24, 2009, 106 (8), pp. 2495-2499.

Wei, et al., Fabrication of Large Area Arrays of Vertically Aligned Gold Nanorods, Nano Letters, 2018, 18, pp. 4467-4472.

Chen, et al., Fully Printed Separated Carbon Nanotube Thin Film Transistor Circuits and Its Application in Organic Light Emitting Diode Control, Nano Letters, 2011, 11, pp. 5301-5308.

Green, et al., Bright and Ultrafast Photoelectron Emission from Aligned Single-Wall Carbon Nanotubes through Multiphoton Exciton Resonance, Nano Lett. 2019, 19, pp. 158-164.

Zhang, et al., Thermal Transport in Quasi-1D van der Waals Crystal Ta2Pd3Se8 Nanowires: Size and Length Dependence, ACS Nano 2018, 12, pp. 2634-2642.

Vajtai, Springer Handbook of Nanomaterials, 2013, 1234 pp.

"Bati, et al., Synthesis, purification, properties and characterization of sorted single-walled carbon nanotubes, Nanoscale, 2018, 10, pp. 22087-22139".

Janas, Toward Monochiral Carbon Nanotubes: A Review of Progress in the Sorting of Single-walled Carbon Nanotubes, Materials Chemistry Frontiers, 2018 (2), 29 pp.

Fagan, Aqueous Two Polymer Phase Extraction of Single Wall Carbon Nanotubes Using Surfactants, Nanoscale Advances, 2019 (1), pp. 3307-3324.

Khripin, et al., High Resolution Length Fractionation of Surfactant Dispersed Carbon Nanotubes, Analytical Chemistry, 2013 (85), pp. 1382-1388.

Takenobu, et al., Stable and Controlled Amphoteric Doping by Encapsulation of Organic Molecules Inside Carbon Nanotubes, Nature Materials, Oct. 2003 (2), pp. 683-688.

Cambre, et al., Separation and Diameter-Sorting of Empty (End-Capped) and Water-Filled (Open) Carbon Nanotubes by Density Gradient Ultracentrifugation, Angew. Chem. Int. Ed. 2011 (50), pp. 2764-2768.

Fagan, et al., Separation of Empty and Water Filled Single Wall Carbon Nanotubes, ACS Nano, 2011 (5), 5, pp. 3943-3953.

Cambre, et al., Asymmetric Dyes Align Inside Carbon Nanotubes to Yield a Large Nonlinear Optical Response, Nature Nanotechnology, Mar. 2015 (10), 41 pp.

Campo, et al., Enhancing single-wall carbon nanotube properties through controlled endohedral filling, Nanoscale Horizons, 2016 (1), pp. 317-324.

Ao, et al., Differentiating Left and Right Handed Carbon Nanotubes by DNA, Journal of the Amerian Chemical Society, 2016 (138), pp. 16677-16685.

Hata, et al., Water-Assisted Highly Efficient Synthesis of Impurity-Free Single-Walled Carbon Nanotubes, Science, Nov. 19, 2004 (306), 4 pp.

Muarkami, et al., Growth of Vertically Aligned Single-Walled Carbon Nanotube Films on Quartz Substrates and Their Optical Anisotropy, Chemical Physics Letters, 2004 (385), pp. 298-303.

Jin, et al., Alignment of Carbon Nanotubes in a Polymer Matrix by Mechanical Stretching, Applied Physical Letters, Aug. 31, 1998, (73) 9, 4 pp.

Headrick, et al., Structure-Property Relations in Carbon Nanotube Fibers by Downscaling Solution Processing, Advanced Materials, 2018 (30) 8 pp.

LeMieux, et al., Self-Sorted Aligned Nanotube Networks for Thin-Film Transistors, Science, Jul. 4, 2008 (321), 5 pp.

Walters, et al., In-Plane-Aligned Membranes of Carbon Nanotubes, Chemical Physics Letters, 2001 (338), pp. 14-20.

Hobbie, et al., Self Assembly of Ordered Nanowires in Biological Suspensions of Single Wall Carbon Nanotubes, ACS Nanotubes, 2009 (3), 1, 8 pp.

He, et al., Wafer-sclae Monodomain Films of Spontaneously Aligned Single-Walled Carbon Nanotubes, Nature Nanotechnology, Jul. 2016 (11), 7 pp.

Gao, et al., Science and Applications of Wafer-Scale Crystalline Carbon Nanotube Films Prepared through Controlled Vacuum Filtration, Royal Society Open Science, 2019 (6) 3, 21 pp.

Komatsu, et al., Modulation-Doped Multiple Quantum Wells of Aligned Single-Wall Carbon Nanotubes, Advanced Functional Materials, 2017 (27), 5 pp.

(56) References Cited

PUBLICATIONS

Chiu, et al., Strong and Broadly Tunable Plasmon Resonances in Thick Films of Aligned Carbon Nanotubes, Nano Letters, 2017 (17), pp. 5641-5645.

Katsutani, et al., Direct Observation of Cross-Polarized Excitons in Aligned Single-chirality Single-wall Carbon Nanotubes, Physical Review B, 2019 (99), 12 pp.

Wang, et al., Magnetotransport in Type-enriched Single-wall Carbon Nanotube Networks, Physical Review Materials, 2018 (2), 8 pp.

Zamora-Ledezma, et al., Anisotropic Thin Films of Single-wall Carbon Nanotubes from Aligned Lyotropic Nematic Suspensions, Nano Letters, 2008 (8) 12, pp. 4103-4107.

Kilina, et al., Cross Polarized Excitons in Carbon Nanotubes, PNAS, May 13, 2008 (105) 19, pp. 6797-6802.

Esposito, et al., Size and Shape of Sodium Deoxycholate Micellar Aggregates, J. Phys. Chem., 1987 (91), pp. 356-362.

D'Alagni, et al., Structural Study of the Micellar Aggregates of Sodium Chenodeoxycholate and Sodium Deoxycholate, Langmuir, 1997 (13), pp. 5811-5815.

Toney, et al., Near-Surface Alignment of Polymers in Rubbed Films, Nature, Apr. 20, 1995 (374), 3 pp.

Hartmann, et al., 2D Versus 3D Crystalline Order in Thin Films of Regioregular Poly (3-hexylthiophene) Oriented by Mechanical Rubbing and Epitaxy, Advanced Functional Materials, 2011 (21) pp. 4047-4057.

Burgo, et al., Triboelectricity: Macroscopic Charge Patterns Formed by Self Arraying Ions on Polymer Surfaces, Langmuir, 2012 (28), pp. 7406-7416.

Biniek, et al., High-Temperature Rubbing: A Versatile Method to Align Pi-Conjugated Polymers without Alignment Substrate, Macrmolecules, 2014 (47), pp. 3871-3879.

Li, et al., Replica Molding-based Nanopatterning of Tribocharge on Elastomer with Application to Electrohydrodynamic Nanolithography, Nature Communications, 2018 (9), 9 pp.

Zhu, et al., Linear-Grating Triboelectric Generator Based on Sliding Electrification, Nano Letters, 2013 (13), pp. 2282-2289.

Grzybowski, et al., Electrostatic Self-assembly of Macroscopic Crystals Using Contact Electrification, Apr. 2003 (2), 5 pp.

Stohr, et al., Liquid Crystal Alignment by Rubbed Polymer Surfaces: a Microscopic Bond Orientation Model, Journal of Electronc Spectroscopy and Related Phenomena, 1999 (98-99), pp. 189-207.

Wei, et al., Nonlinear Optical Studies of Liquid Crystal Alignment on a Rubbed Polyvinyl Alcohol Surface, Physical Review E, Oct. 2000 (62) 4, 13 pp.

Fidkowski, et al., Topological Phases of Fermions in One Dimension, Physical Review B 83 (2011), 13 pp.

Deshpande, et al., The One-Dimensional Wigner Crystal in Carbon Nanotubes, Nature Physics 4 (2008), 23 pp.

Wei, et al., Experimental Determination of Excitonic Band Structures of Single-Walled Carbon Nanotubes Using Circular Dichroism Spectra, Nature Communications, 7, Article No. 12899 (2016), 9 pp.

Che, et al., Selective Synthesis and DeviceApplications of Semiconducting Single-Walled Carbon NanotubesUsing Isopropyl Alcohol as Feedstock, (2012) 6, 8, pp. 7454-7462.

Zheng, Sorting Carbon Nanotubes, Top Curr Chem (Cham), Feb. 2017, 36 pp.

\* cited by examiner

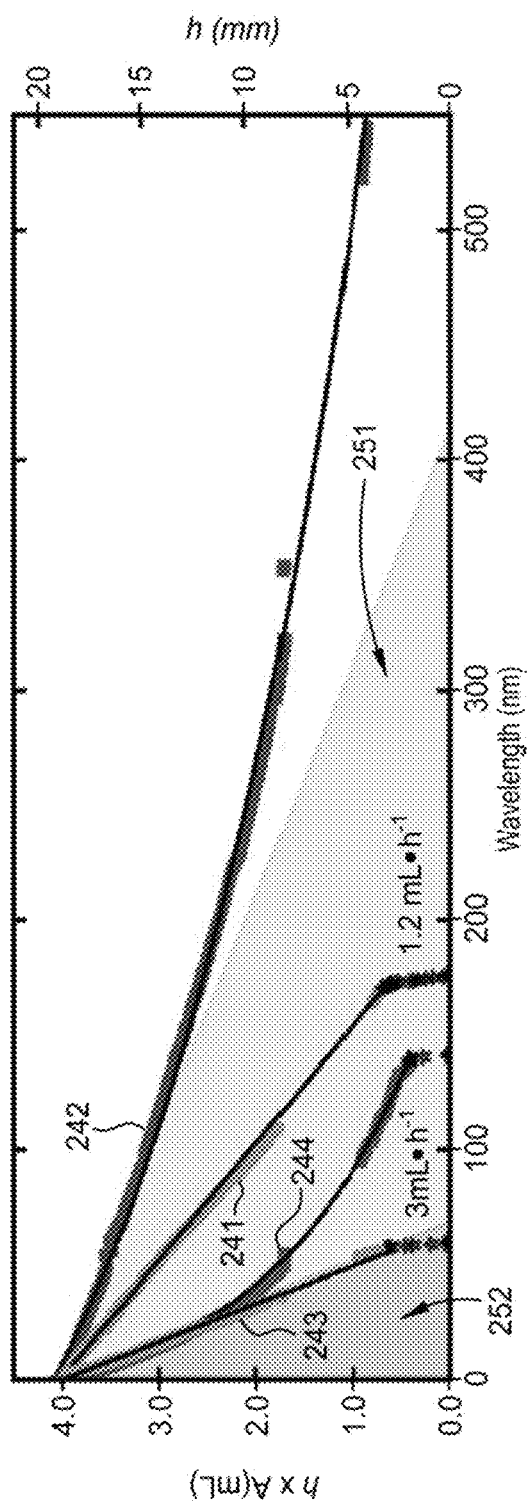
FIG. 2D
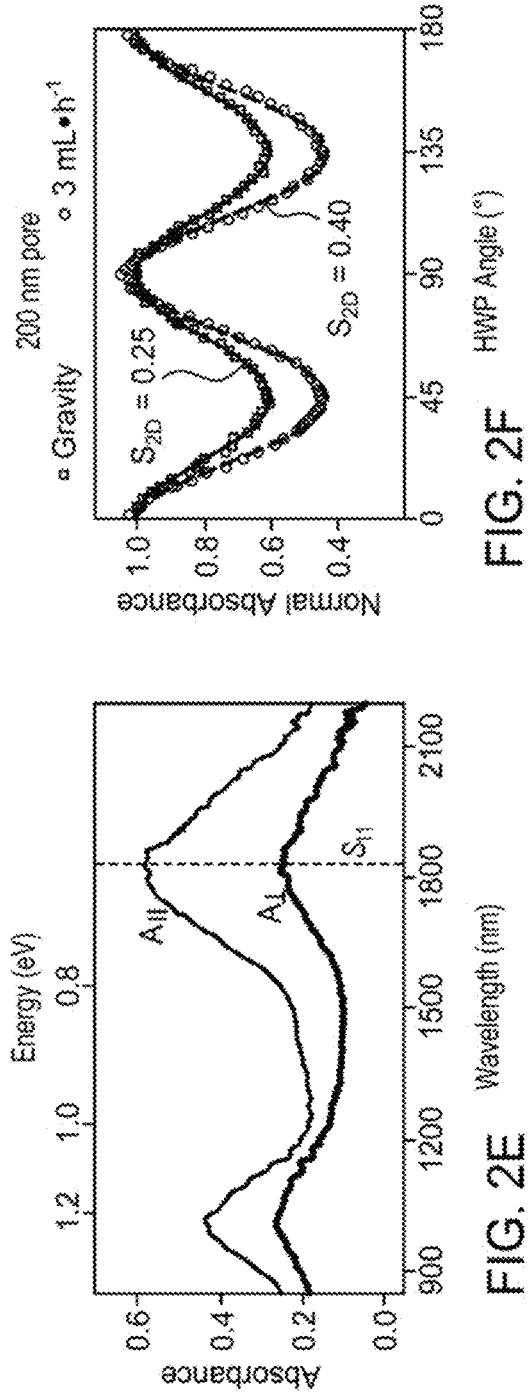
FIG. 2E
FIG. 2F

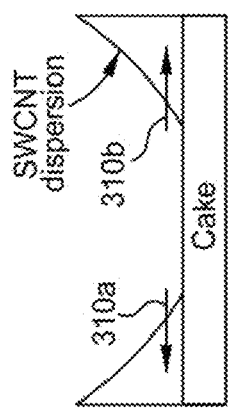
FIG. 3C
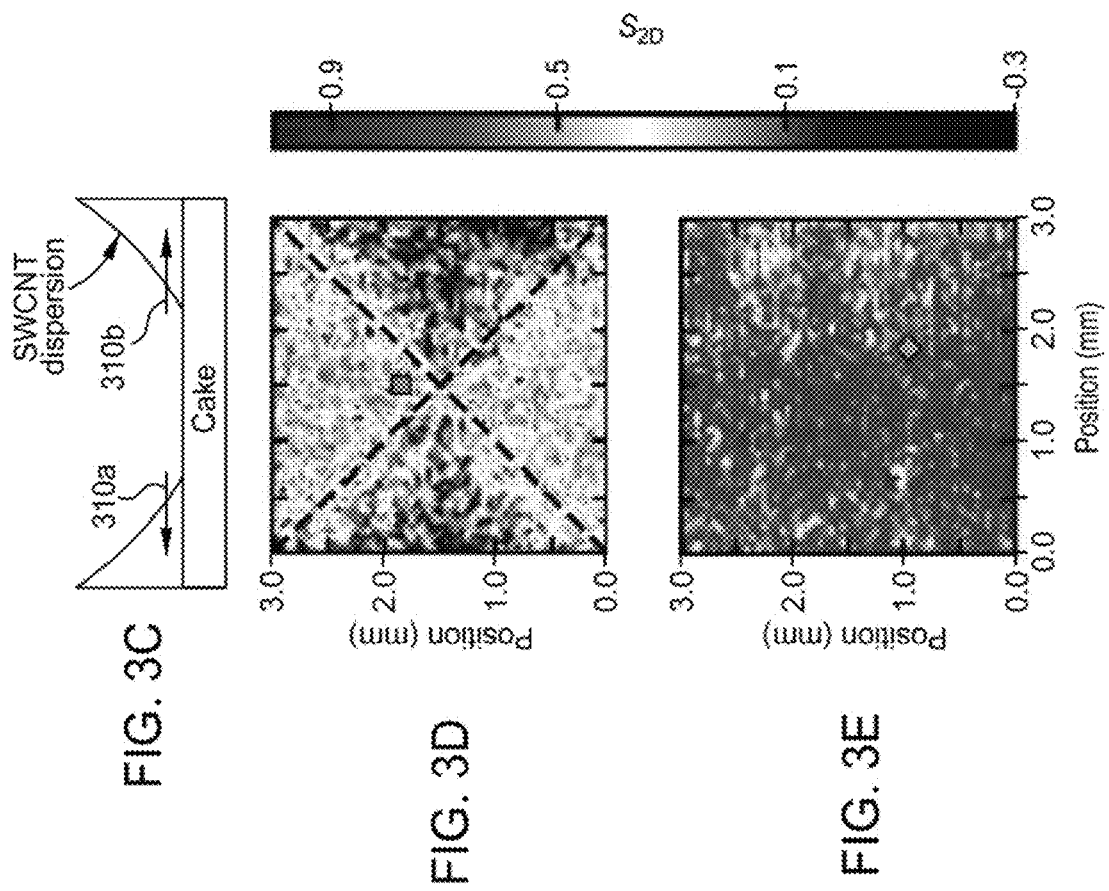
FIG. 3D
FIG. 3E
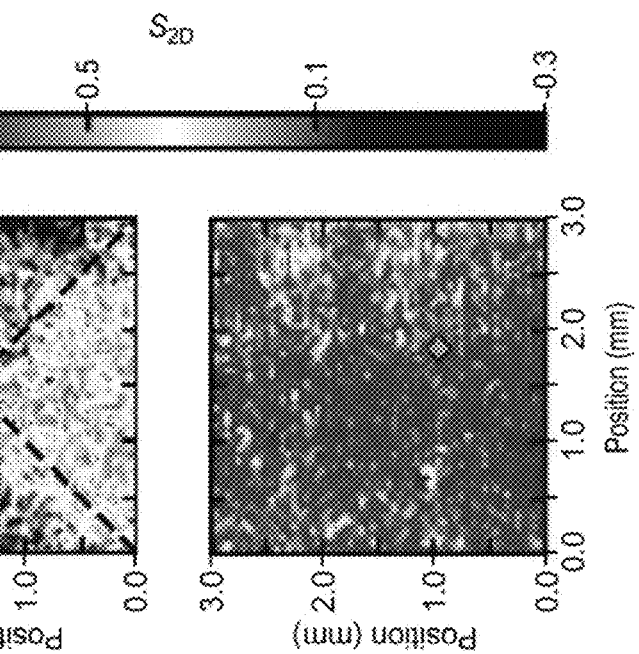
FIG. 3A
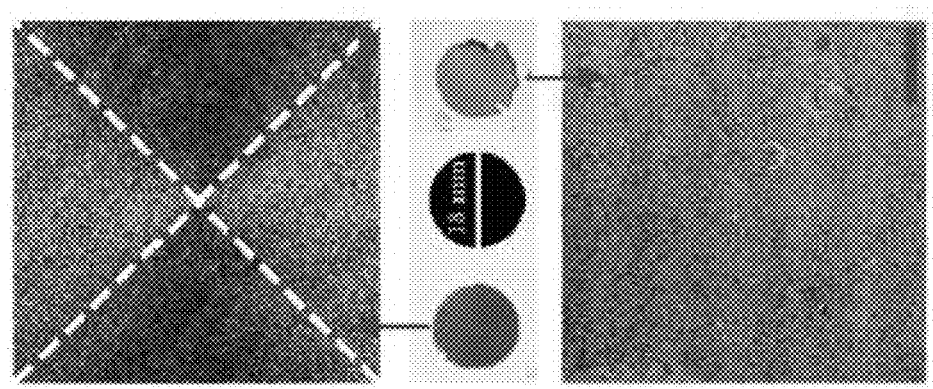
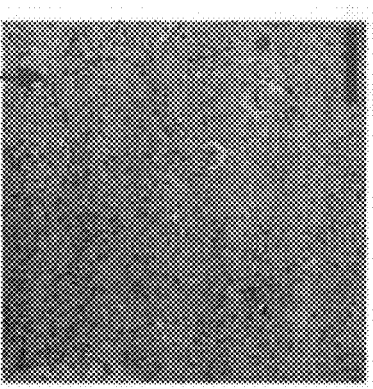
FIG. 3B

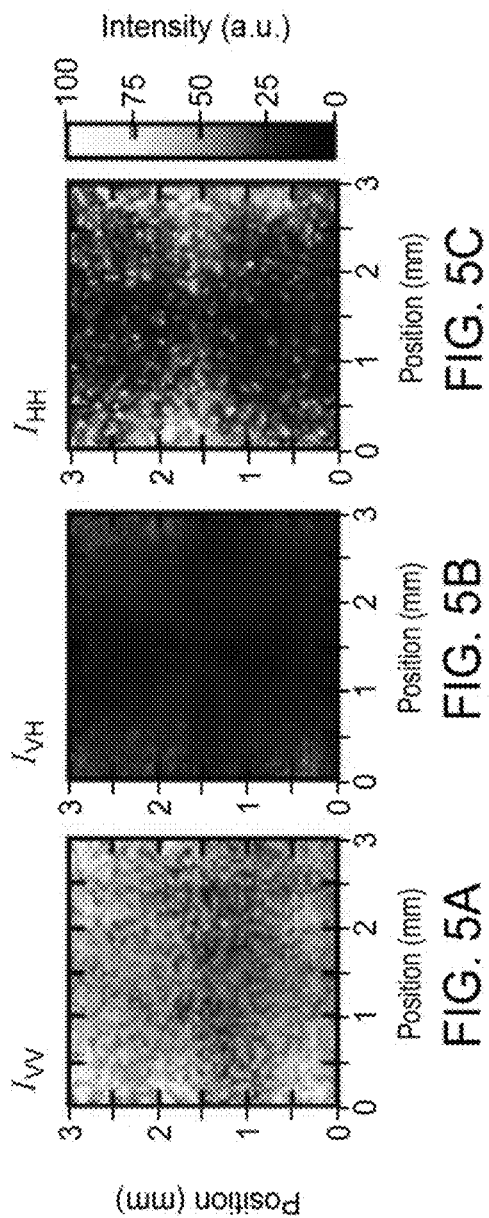
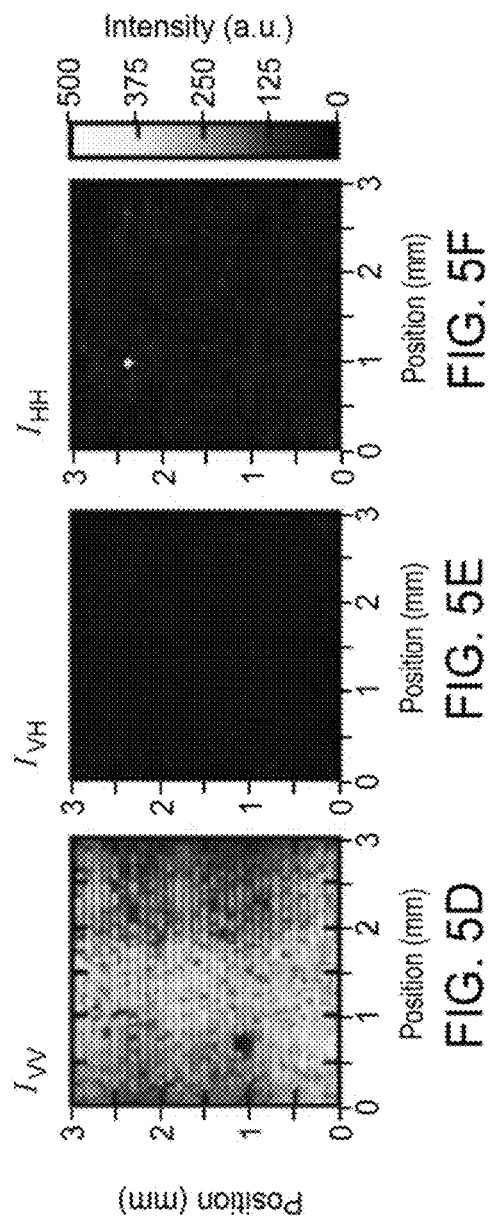
FIG. 5A  FIG. 5B  FIG. 5C
FIG. 5D  FIG. 5E  FIG. 5F

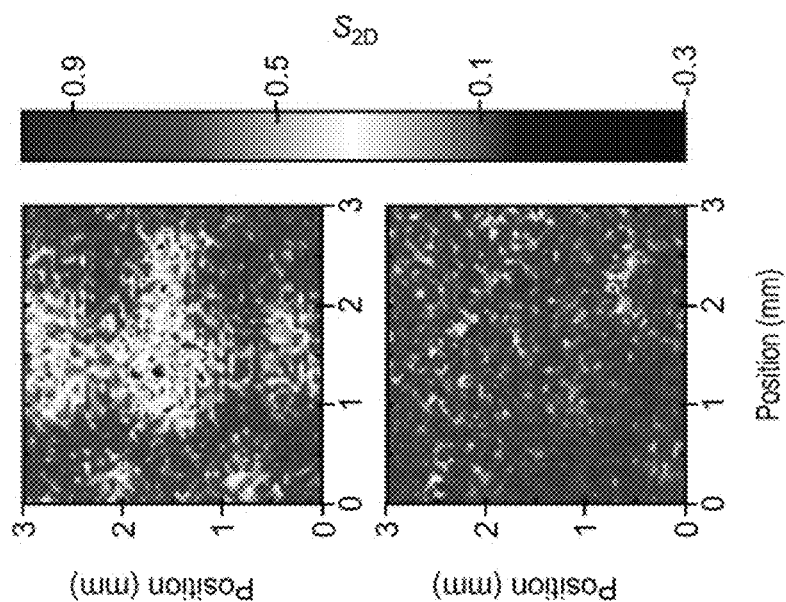
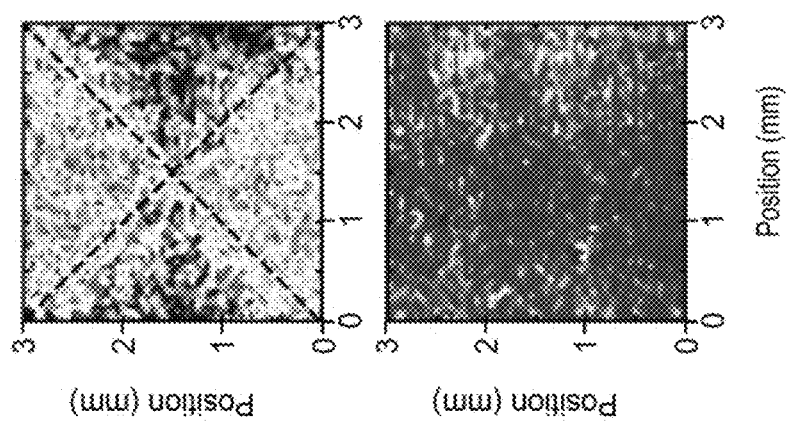
FIG. 10A  FIG. 10B
FIG. 10C  FIG. 10D

PROCESS AND APPARATUS FOR CARBON NANOTUBE FORMATION

CROSS-REFERENCES TO RELATED APPLICATIONS

This application claims priority to U.S. Provisional Application No. 62/914,512, filed Oct. 13, 2019, which is incorporated herein by reference in its entirety.

BACKGROUND

Field

Embodiments of the present disclosure generally relate to processes and apparatus for carbon nanotube formation, and more specifically, to processes and apparatus for carbon nanotube alignment.

Description of the Related Art

Significant interest in one-dimensional (1D) nanocrystals (NCs) follows from their highly anisotropic properties of electrical and thermal transport, optical absorption, radiative emission, and conduction. Typically, physical attributes observed in these NCs are significantly enhanced along the extended 1D crystal axis relative to the short axes, the latter often serving to impose strict quantum-mechanical boundary conditions on the band structure. Researchers have utilized the anisotropic nature of 1D NCs in polymer chains, liquid crystals, inorganic crystals, carbonaceous ribbons (e.g., graphene), and nanotubes to explore physically-interesting 1D behaviors like Luttinger liquids, time-reversal-invariant Majorana chains, Wigner crystals, ultra-strong light-matter coupling, high-harmonic generation, Aharonov-Bohm physics, intersubband plasmons, and topological insulators. Additionally, 1D NCs have been envisioned in a wide range of technologically important applications, such as high current-carrying capacity conductors, rectifiers, far-infrared polarizers and detectors, gas and molecular sensing, flexible electronics, photoelectron emission, and directional heat transport.

Consequently, enhancing these anisotropic effects by aligning 1D NCs along a common axis via easy-to-control mechanical, electrical, or magnetic external forces is highly desirable. However, the high degree of van der Waals interactions per unit mass in these nanosystems promotes particle aggregation, which contributes to the difficulty in creating globally-aligned macroscopic films of 1D NCs.

Among the major 1D NC groupings, single-wall carbon nanotubes (SWCNTs) are particularly difficult to reproducibly align, especially after SWCNTs have gone through solution-based processing. Despite the well-known challenges involved in nanotube preparation, strong interest remains in working with SWCNTs due to their unique band structures and exemplary physical properties. Alignment of nanotubes along a preferred direction has been achieved, but often with significant caveats or limited scope. For example, good alignment of nanotubes can be achieved via synthesis on a surface, but usually with contaminants, low nanotube density, and poor species selectivity. Field driven alignment in solution relaxes as soon as the field is removed, and it is difficult to generate high degrees of alignment by such methods. In polymers, mechanical pulling can achieve alignment, but nanotube density is typically quite low. Other methods of aligning nanotubes, such as vertically oriented forests and feedstock-driven growth, are hindered by technical barriers, low density, and poor species [(n,m)] selectivity. Researchers have used a variety of techniques to align nanotubes including non-chiral-enriched, vertically-oriented SWCNT forests, mechanical pulling of polymers, electrostatic-enhanced dropcast films, magnetic alignment, nanowire self-assembly, and feedstock-driven growth.

Recently, it has been demonstrated that SWCNTs formed along a particular axis when a nanotube solution was slowly filtered through a hydrophilic, polyvinylpyrrolidone (PVP)-coated nanoporous membrane. This observation enables production of well-aligned polarized SWCNT films after solution-based chemical processing (e.g., chiral enrichment or length sorting). However, this technique is challenging to reproduce and even more difficult to scale up, which has hindered its widespread adoption. Furthermore, characterization of filtration-based nanotube alignment is limited due to the absence of a true macroscopic characterization technique as well as a reliance on single-side film measurements. Challenges of scale and reproducibility of this technique are due to membranes varying in their intrinsic effectiveness in aligning SWCNTs batch-to-batch and membrane-to-membrane, and an operator manually adjusting the flow rate and the vacuum pressure (possibly vibrating the apparatus) by slight adjustments to a valve over extended time periods.

Accordingly, what is needed in the art are improved processes and apparatus for carbon nanotube formation and alignment.

SUMMARY

Embodiments of the present disclosure generally relate to processes and apparatus for carbon nanotube formation, and more specifically, to processes and apparatus for carbon nanotube alignment.

In an embodiment, a process for aligning carbon nanotubes is provided. The process includes introducing an aqueous solution to a pressure-controlled system that includes a silanated glass element, a porous membrane, and a container. The process further includes applying a pressure differential across the porous membrane to draw the aqueous solution from the silanated glass element, through the porous membrane, and to the container at a flow rate to form a filtrate disposed within the container and a retentate disposed above the porous membrane, the retentate comprising carbon nanotubes. The process further includes optically detecting a position of a meniscus of the aqueous solution in the silanated glass element.

In another embodiment, a process for forming carbon nanotubes is provided. The process includes introducing a first aqueous solution to a pressure-controlled system comprising a silanated glass element, a porous membrane, and a container. The process further includes applying a pressure to the pressure-controlled system to draw the first aqueous solution from the silanated glass element, through the porous membrane, and to the container at a flow rate to form a filtrate disposed within the container and a retentate disposed above the porous membrane, the retentate comprising carbon nanotubes. The process further includes changing the pressure of the pressure-controlled system and forming carbon nanotubes on the porous membrane. Changing the pressure of the pressure-controlled system includes optically detecting a position of a meniscus of the first aqueous solution in the silanated glass element with an optical device, measuring the flow rate, a height of the meniscus, or both, and determining a pressure based on the measured flow rate, the position of the meniscus, or both.

In another embodiment, an apparatus for forming aligned carbon nanotubes is provided. The apparatus includes a membrane defining a retentate side and a filtrate side, a container on the filtrate side of the membrane, a pressure source coupled to the container, and a silanated glass element coupled to the container, wherein at least a portion of the silanated glass element is on the filtrate side of the membrane, and wherein the silanated glass element has a meniscus-to-glass contact angle of about 80° to about 100°.

In another embodiment, a carbon nanotube alignment process is provided. The process includes filtering an aqueous solution of carbon nanotubes in silanated glassware, wherein the filtering is performed in a pressure-controlled system with a constant flow rate and a meniscus of the solution is flattened to remove spherulite formation on a single-wall carbon nanotube film.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2D is exemplary time-dependence data of the measured SWCNT dispersion volume for different membrane pore sizes and pressure conditions according to at least one embodiment of the present disclosure.

FIG. 2E is exemplary polarized absorbance spectra of an example SWCNT film produced using a 200 nm pore membrane according to at least one embodiment of the present disclosure.

FIG. 2F is exemplary data showing normalized, polarized $S_{11}$ absorption spectra of example films made with a 200 nm pore membrane using a constant flow rate or gravity filtration according to at least one embodiment of the present disclosure.

FIG. 3A is an exemplary cross-polarized microscope image showing the formation of a 2D spherulite (radial surface SWCNT alignment due to meniscus combing) on the front side of the SWCNT film (Scale bar: 1500 μm) according to at least one embodiment of the present disclosure.

FIG. 3B is an exemplary cross-polarized microscope image of an example SWCNT film created using silanated glassware (Scale bar: 1500 μm) according to at least one embodiment of the present disclosure.

FIG. 3C is an exemplary illustration of the radial alignment of SWCNTs and uneven cake deposition created by meniscus combing at the end of a filtration process according to at least one embodiment of the present disclosure.

FIG. 3D is an exemplary spatial map of a two-dimensional nematic ordering parameter, $S_{2D}$, of the front side of the example film in FIG. 3A as measured by polarized Raman spectroscopy at 532 nm according to at least one embodiment of the present disclosure. (The square marker indicates where the Raman spectrum shown in FIG. 3F is collected).

FIG. 3E is an exemplary spatial map of $S_{2D}$ for the front side of the example film in FIG. 3B according to at least one embodiment of the present disclosure. (The diamond marker indicates where the Raman spectrum shown in FIG. 3F is collected).

FIG. 5A is an exemplary spatially-resolved polarized Raman spectroscopy map of an intensity parameter, $I_{VV}$, used in the calculation of the $S_{2D}$ nematic order parameter in FIG. 3D according to at least one embodiment of the present disclosure.

FIG. 5B is an exemplary spatially-resolved polarized Raman spectroscopy map of an intensity parameter, $I_{VH}$, used in the calculation of the $S_{2D}$ nematic order parameter in FIG. 3D according to at least one embodiment of the present disclosure.

FIG. 5C is an exemplary spatially-resolved polarized Raman spectroscopy map of an intensity parameter, $I_{HH}$, used in the calculation of the $S_{2D}$ nematic order parameter in FIG. 3D according to at least one embodiment of the present disclosure.

FIG. 5D is an exemplary spatially-resolved polarized Raman spectroscopy map of an intensity parameter, $I_{VV}$, used in the calculation of the $S_{2D}$ nematic order parameter in FIG. 3E according to at least one embodiment of the present disclosure.

FIG. 5E is an exemplary spatially-resolved polarized Raman spectroscopy map of an intensity parameter, $I_{VH}$, used in the calculation of the $S_{2D}$ nematic order parameter in FIG. 3E according to at least one embodiment of the present disclosure.

FIG. 5F is an exemplary spatially-resolved polarized Raman spectroscopy map of an intensity parameter, $I_{HH}$, used in the calculation of the $S_{2D}$ nematic order parameter in FIG. 3E according to at least one embodiment of the present disclosure.

FIG. 10A is an exemplary spatially-resolved measurement of $S_{2D}$ collected using polarized Raman spectroscopy of the back side of an example SWCNT film made with non-silanated glassware according to at least one embodiment of the present disclosure.

FIG. 10B is an exemplary spatially-resolved measurement of $S_{2D}$ collected using polarized Raman spectroscopy of the front side of an example SWCNT film made with non-silanated glassware according to at least one embodiment of the present disclosure.

FIG. 10C is an exemplary spatially-resolved measurement of $S_{2D}$ collected using polarized Raman spectroscopy of the front side of an example SWCNT film made with silanated glassware according to at least one embodiment of the present disclosure.

FIG. 10D is an exemplary spatially-resolved measurement of $S_{2D}$ collected using polarized Raman spectroscopy of the back side of an example SWCNT film made with silanated glassware according to at least one embodiment of the present disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to processes and apparatus for carbon nanotube formation, and more specifically, to processes and apparatus for carbon nanotube alignment. Embodiments described herein utilize an automated and parallelized filtration system to reproducibly and simultaneously create multiple highly-aligned, solution-based SWCNT films, thus enabling determination of a large set of chemical and physical parameters under well-controlled conditions. Using machine vision, measurement and control of the filtration flow rate for different filter membrane pore sizes is enabled by monitoring the solution meniscus and regulating the trans-membrane pressure. An automated feedback loop produces a constant filtration flow rate, which not only improves SWCNT alignment, but also enables this technique to be applied to different varieties of synthesized SWCNTs.

Additionally, a combination of polarized optical techniques and glass silanation are utilized to identify and remove the formation of a meniscus-created, radial SWCNT alignment. In some examples, spatial mapping of both sides of the SWCNT film using polarized Raman scattering shows a two-dimensional (2D) nematic ordering parameter, $S_{2D}$, of about 0.9 throughout the film, which demonstrates true global alignment from solution-based SWCNTs. Finally, based on experiments tuning the electrostatic environment, it is believed that charge ordering on the filter membrane is one of the driving forces involved in the spontaneous alignment of SWCNTs along a common axis.

Conventional methods are limited by, e.g., scalability, reproducibility, and alignment of the SWCNT films and embodiments described herein solve these challenges. Further, in contrast to conventional methods of forming and aligning nanotubes, the processes described herein use automated settings with a feedback loop, where, e.g., pressure is used as a proxy for voltage. Briefly, the membrane upon which the SWCNT film is formed has a certain amount of resistance to the flow of the liquid. As the membrane is loaded with SWCNTs, the resistance increases. In order to maintain a constant flow rate through the membrane, the applied pressure is changed. In some embodiments, periodic, or constant, measurement of various parameters, along with electronic tracking of the meniscus enables the feedback loop. Further, multiple SWCNT films can be formed and aligned simultaneously in parallel, which results in improved scalability.

Figure 1A:
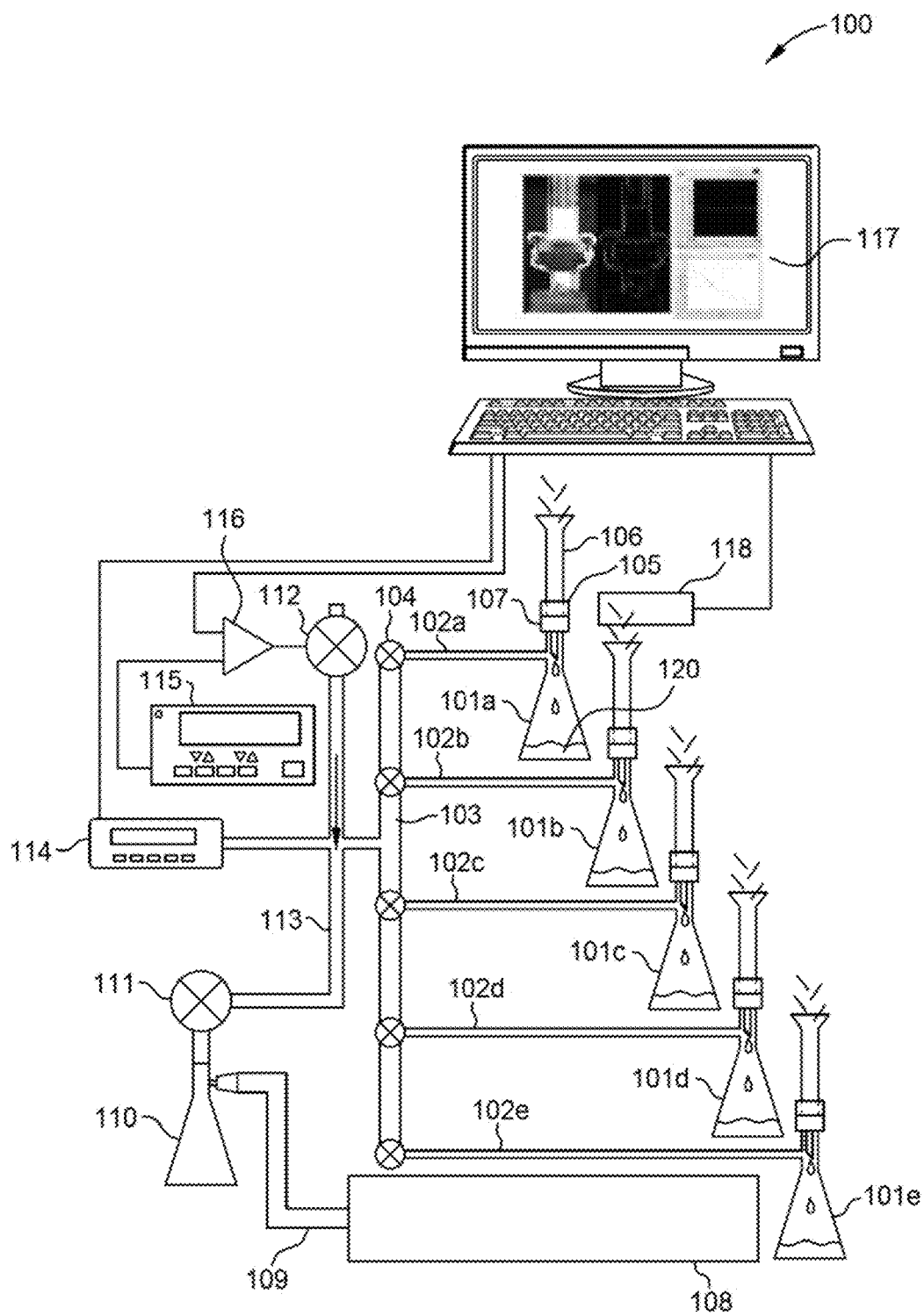
FIG. 1A is a schematic illustration of an example automated, parallelized filtration apparatus according to at least one embodiment of the present disclosure.
Figure 1B:
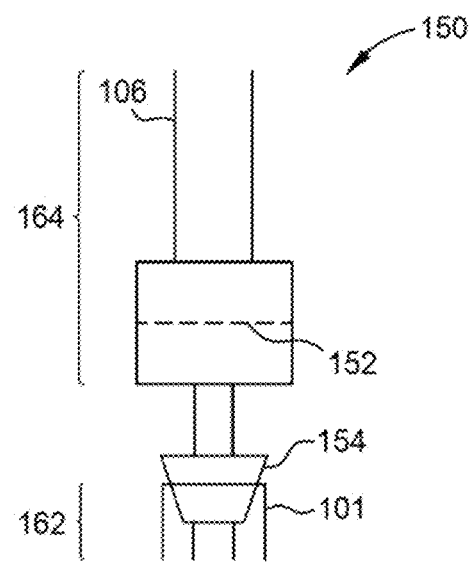
FIG. 1B is a schematic illustration of a portion of the example filtration apparatus shown in FIG. 1A according to at least one embodiment of the present disclosure.

FIG. 1A is a schematic illustration of the automated, parallelized filtration apparatus 100 according to at least one embodiment of the present disclosure. FIG. 1B is a schematic illustration of a portion 150 of the example filtration apparatus shown in FIG. 1A. The filtration apparatus 100 includes one or more containers 101 (e.g., filter flasks) connected to a vacuum source 108 via a manifold 103 and tubing 102. Although five containers 101a-101e and five tubings 102a-102e are shown, more or less containers and tubings can be used. A stopcock valve(s) 104, or other suitable valve type, is located at the connection between the tubings 102 and the manifold 103. The stopcock valve 104 enables the manifold 103 to be vented when used under closed conditions without breaking the vacuum connection. That is, stopcock valve 104 enables implementation of parallel assemblies that can be turned on or off as desired.

Referring to FIG. 1B, the apparatus 100 has a retentate side 164, where a nanotube film is retained, and filtrate side 162. The filtrate side 162 includes the container 101 (filtrate labeled as 120 in FIG. 1A), where the filtrate is collected after passing through a porous membrane 152. The retentate side 164 includes a frit/filter support 107, a glass element 106 (e.g., a funnel), and the bottom of glass element 106 indicated as numeral 105 (where the thickness of the glass element 106 changes). The porous membrane 152 defines the retentate side 164 and the filtrate side of the apparatus 100. The porous membrane 152 is placed on top of the mesh frit (not shown), such as a stainless steel mesh frit.

In some embodiments, the porous membrane is porous to a liquid medium of an aqueous solution and impervious to carbon nanotubes. The glass element 106 is coupled to the container 101 by a stopper 154 (shown in FIG. 1B). The filtration apparatus 100 can also include one or more gaskets (not shown), such as polytetrafluoroethylene (PTFE) gaskets. One gasket can be placed under the mesh frit and another gasket can be placed on top of the porous membrane 152.

Various types of membranes, such as hydrophilic membranes, for example, polyvinylpyrrolidone (PVP)-coated membranes, having various pore sizes can be used. In some embodiments, nominal pore sizes of the membrane ranges from about 50 nm to about 250 nm, such as from about 80 nm to about 200 nm, such as from about 100 nm to about 150 nm.

The filtration apparatus 100 further includes a vacuum source 108 coupled to the filtrate side 162 of the filtration apparatus 100 via tubing 109 (e.g., vacuum tubing) to vacuum flask 110 (e.g., a Buchner flask). The vacuum source 108 draws filtrate through membrane 152 at a desired rate to the container 101. The vacuum source 108 is regulated through the use of a needle valve 111 and a proportioning solenoid valve (PSV) 112, which acts as a controllable leak. A connection 113 (e.g., a tubing) connects vacuum flask 110, needle valve 111, PSV 112, manifold 103, and pressure gauge 114. The filtration apparatus 100 is powered by a power supply 115. The power supply 115 can be batteries, AC power supply, DC power supply, and the like. In some embodiments, a camera 118 is positioned above and/or beside the container 101. The camera 118 can be used to, e.g., monitor formation of the nanotubes, monitor alignment of the nanotubes, detection of a meniscus, and further functions described below.

The PSV 112 (normally closed) runs on a source voltage, such as a 16 V-source voltage, which is controlled via control unit 116 via a computer 117-controlled digital-to-analog converter. The PSV 112 and pressure gauge 114 are used to control the pressure of the system. According to at least one embodiment, one or more operations of the filtration apparatus 100 and processes described herein can be included as instructions in a computer-readable medium for execution by the control unit 116 (e.g., one or more processors) or any other processing system. The computer-readable medium can include any suitable memory for storing instructions, such as read-only memory (ROM), random access memory (RAM), flash memory, an electrically erasable programmable ROM (EEPROM), a hard disk drive, a compact disc ROM (CD-ROM), a floppy disk, punched cards, magnetic tape, and the like.

In some embodiments, an individualized SWCNT solution ready for filtration is prepared according to the following non-limiting procedure. Different SWCNT-fabricated types can be used, such as laser oven, high-pressure carbon monoxide (HiPCO), cobalt-molybdenum catalyst (CoMoCAT), arc-discharge, etc. Electric arc-discharge SWCNTs are dispersed via sonication (e.g., tip sonication) in a solution (about 10 g/L to about 50 g/L, such as about 15 to 40 g/L such as from about 20 g/L to about 30 g/L) of salt/detergent in water. Useful salts/detergents are any salts/detergents that are suitable to keep the nanotubes about 1 nm apart or more and/or to make the van der Waals forces between the nanotubes not too great. An example salt is sodium deoxycholate (DOC) in water. Additionally, or alternatively, other salts, detergents, and anionic dispersants can be used. These include sodium dodecyl benzyl sulfonate (SDBS), sodium cholate, and/or other di and tri-hydroxy bile salt variants including sodium taurocholate, sodium glycocholate, sodium taurodeoxycholate, sodium glycodeoxycholate, sodium chenodeoxycholate, and sodium ursodeoxycholate, or a combination thereof.

The dispersion is then centrifuged to remove non-SWCNT contaminants. To mitigate discrepancies between water- and non-water-filled SWCNTs, nanotubes filled with a hydrocarbon (such as pentane, hexane, heptane ($C_7H_{16}$), and/or octane, and isomers thereof, such as dimethylpentane) were utilized.

Next, a rate-zonal centrifugation method is applied to sort the nanotube solution to remove bent and very short SWCNTs. At the end of this multi-operation procedure, which also includes removal of solution components other than $H_2O$, DOC, and SWCNTs via ultrafiltration and increasing the SWCNT concentration, a mixed-chirality SWCNT solution composed of long, straight tubes, in, e.g., 10 g/L DOC (or from about 1 g/L to about 30 g/L, such as from about 5 g/L to about 20 g/L, such as from about 10 g/L to about 15 g/L) were obtained. Prior to filtration, the SWCNT dispersion is diluted to have a DOC concentration of about 0.03 wt % (or less than about 0.1 wt %, such as less than about 0.05 wt %), and a SWCNT concentration of about 8 μg/mL (or less than about 50 μg/mL, such as less than about 25 μg/mL, such as less than about 15 μg/mL, such as less than about 10 μg/mL), the concentrations of which can be determined through optical density measurements.

In operation, a SWCNT dispersion is pipetted into the glass element 106 (e.g., a glass funnel) of the filtration apparatus 100, so as to not mechanically disturb the individualization of SWCNTs. A vacuum (or negative pressure), of a suitable amount of pressure, is applied to the filtrate side 162 of the filtration apparatus 100. The desired pressure(s) to be applied for controlled flow rate is then loaded into the software program, and the program is started. In some embodiments, the vacuum pressure applied from the vacuum source is from about 20 kPa to about 40 kPa, such as from about 25 kPa to about 35 kPa, such as from about 25 kPa to about 30 kPa or from about 30 kPa to about 35 kPa. In at least one embodiment, the vacuum pressure is about 28.8 kPa. Accurate and precise (±2 Pa) applied pressure control is achieved across a broad pressure range.

In some embodiments, the region of interest in the camera image of the filtration apparatus is selected such that a triggering event will occur when, e.g., the remaining volume is near a volumetric threshold and/or when the height of the meniscus is near a height threshold. When the triggering event occurs, the pressure is changed such that the flow rate remains constant. The desired flow rate can depend on, e.g., the scale of the filtration apparatus 100, and/or the pore size of the membrane, among other factors. In some examples, the flow rate is about 1 mL/h to about 100 mL/h, such as from about 5 mL/h to about 50 mL/h, such as from about 10 mL/h to about 20 mL/h or from about 10 mL/h to about 15 mL/h.

Figure 1C:
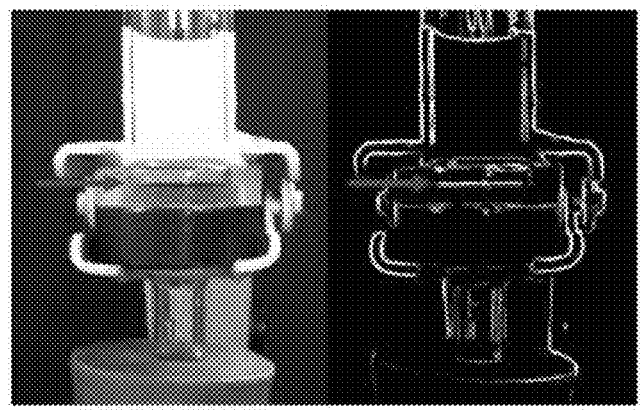
FIG. 1C shows images of an example filtration apparatus taken during filtration (left) and the corresponding contrast-enhanced edge image produced using a Canny edge algorithm (right) according to at least one embodiment of the present disclosure.

In some embodiments, to implement machine-vision detection of the meniscus and to enable the software to easily and readily identify edges and discontinuities, the filtration apparatus 100 can be modified. Such modifications include masking the back of the bottom 105 of glass element 106 with white vinyl tape, masking the frit/filter support 107 with blue vinyl tape, and placing the filtration apparatus 100 in front of a black backdrop. The blue, white, and black colors create contrast, which clearly defines the edges for detection and tracking. The white tape masking the back of the bottom 105 of the glass element provides contrast between different SWCNT dispersions and the bottom 105 of the glass element itself, the blue tape defines the bottom edge of the glass element 106, and the black backdrop defines the outline of the glass element 106. These differences are seen in FIG. 1C. The arrows in both images of FIG. 1C highlight the meniscus edge, which is detected, numerically fit, and monitored during filtration. Although the colors white, blue, and black are described, it is contemplated that any combination of different colors which exhibit sufficient contrast may be used in any combination.

In some embodiments, and to automate the filtration apparatus 100 shown in FIG. 1A, software is utilized to detect, numerically fit, and control the edge of the SWCNT solution meniscus. Meniscus detection and tracking is performed using an adaptable detection algorithm to convert the real image to an edge outline, as shown in FIG. 1C. The software numerically fits the meniscus edge from this outline, which significantly reduces fluctuation-created false positives. Because the meniscus is tracked as a function of time, it serves as a measure of flow rate. Pressure is maintained via a PID-controlled variable leak using the PSV with a suitable applied source vacuum. The pressure is increased at the end of the filtration process to dry the film and prevent disrupting the still-wet SWCNT structure.

Besides eliminating human control from the alignment process, the apparatus for machine vision-based SWCNT film configuration described herein enables production upscaling. As detailed in FIG. 1A, although just one filtration rig (master rig') is monitored, multiple films can be simultaneously produced by putting filtration assemblies in parallel. Since each parallelized assembly is identical or nearly identical to the master rig, excellent alignment for several SWCNT films is achieved. The combination of automation and parallelization enables production of multiple copies of aligned films under a wide range of different physical and chemical conditions.

The following examples are not intended to limit embodiments of the present disclosure.

EXAMPLES

Example 1: Preparation of Single-Wall Carbon Nanotube (SWCNT) Dispersions

Electric arc-synthesized SWCNTs (Carbon Solutions, Riverside Calif., P2 grade, lot #02-A011) were incubated in neat n-heptane (EMD Millipore) for greater than about 12 hours, which filled the entire nanotube population with the alkane. After incubation, the $C_7H_{16}$-SWCNT powder was filtered against a membrane (filter code VVLP, 0.1 μm, Millipore) and allowed to fully dry at room temperature.

The $C_7H_{16}$-SWCNT soot was dispersed in multiple ~40 mL aliquots via tip sonication (45 minute, ~0.9 W/mL), in each case with the vial in an ice-water bath at a nominal concentration of about 1 mg/mL of SWCNTs in about 20 g/L sodium deoxycholate (DOC, Sigma BioXtra) in water solution. Initial purification on the combined aliquots was performed via centrifugation in a J2-21 high-speed centrifuge (JA-20 rotor, about 18 kRPM, about 2 hours), after which the resulting supernatant was collected. This sonicated-centrifuged dispersion was subsequently layered (~8.2 mL) above a dense race layer (about 28 mL) comprised of ~10 wt/v % iodixanol (Sigma, sold as Optiprep™) and a dense race layer of about 10 g/L DOC for rate-zonal purification (VTi 50 rotor, about 50 kRPM, about 2 h 45 minute, about 20° C.) in a Beckman L80-XP ultracentrifuge collecting the main band in the center of the tube after centrifugation. Stirred ultrafiltration cells (Millipore) were used to both reduce the iodixanol concentration to about <<1 μg/mL and to concentrate the SWCNT dispersion to about ≥1 mg/mL in about 10 g/L DOC solution as determined by absorbance spectroscopy using an extinction coefficient of about 2.1 A mg/mL mm at about 850 nm.

Example 2: Filtration Apparatus

The filtration apparatus includes the following components: a borosilicate funnel (15 mL), a stainless steel (SS) mesh frit (25 mm), and a borosilicate glass frit support. The assembly also used a spring-loaded clamp for securing the funnel in place, a silicone stopper, and two polytetrafluoroethylene (PTFE) gaskets. One of the gaskets is placed under the SS mesh frit, and the other is placed on top of the wetted, hydrophilic polyvinylpyrrolidone (PVP)-coated membrane.

Once the filtration system is assembled and connected to a Buchner flask for vacuum filtration, a vacuum source is attached and about 28.8 kPa pressure is applied to the system. The source vacuum is then regulated through the use of a needle valve and proportioning solenoid valve (PSV), which acts as a controllable leak. The PSV (normally closed) runs on a 16 V-source voltage, which is controlled using a separate 5 V-modulated controller via a computer-controlled digital-to-analog converter. The PSV and a digital pressure gauge are used to control the pressure of the system. The use of stopcock valves enable the implementation of parallel assemblies that can be turned on or off as desired.

Various pore sizes of the PVP-coated membranes are then used for carrying out the experiments. About 4 mL of a SWCNT dispersion is carefully pipetted into the assembly funnel, so as to not mechanically disturb the individualization of SWCNTs. The desired pressure(s) to be applied for controlled flow rate are then loaded into the software program, and the program is started. The region of interest in the camera image of the filtration assembly is selected such that a triggering event will occur when the remaining volume is near about 0.7 mL. When the trigger event occurs, the pressure is increased such that the flow rate falls between about 10 mL/h to about 15 mL/h.

Figure 1D:
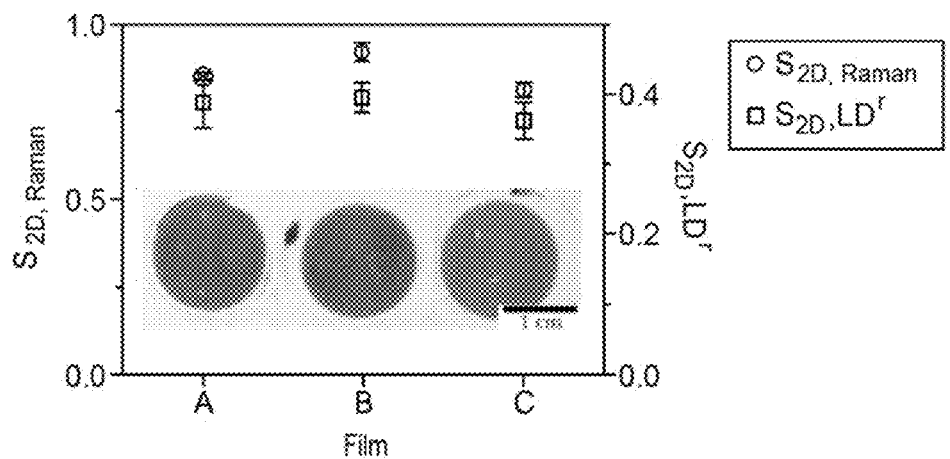
FIG. 1D is exemplary data illustrating dimensional reduced linear dichroism, $LD'_{2D}$, for three example SWCNT films made in parallel according to at least one embodiment of the present disclosure. (The inset shows pictures of the corresponding aligned SWCNT films.)

As an example of this high degree of uniformity achieved by the filtration apparatus 100, FIG. 1D shows that three films were simultaneously produced in the parallelized system, each of which have nearly identical 2D nematic ordering ($S_{2D}$). $S_{2D}$ is utilized as a measure of SWCNT alignment in films described herein (measurement details described below). The high and uniform degree of alignment confirms that each separate arm of the parallelized system is equivalent.

Figure 1E:
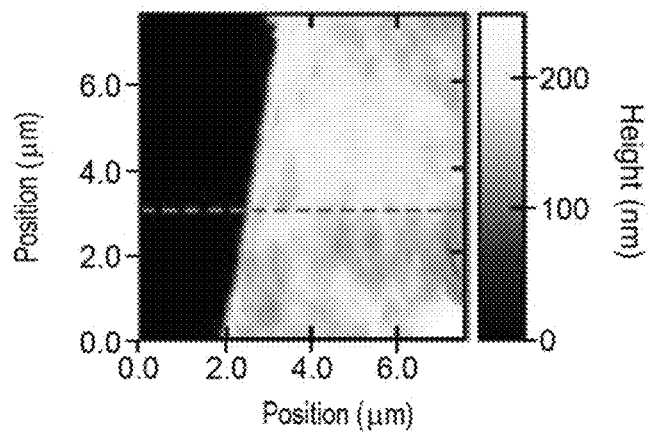
FIG. 1E illustrates an exemplary atomic force microscopy (AFM) height map of an example film made with 0.030 wt % DOC according to at least one embodiment of the present disclosure.
Figure 1F:
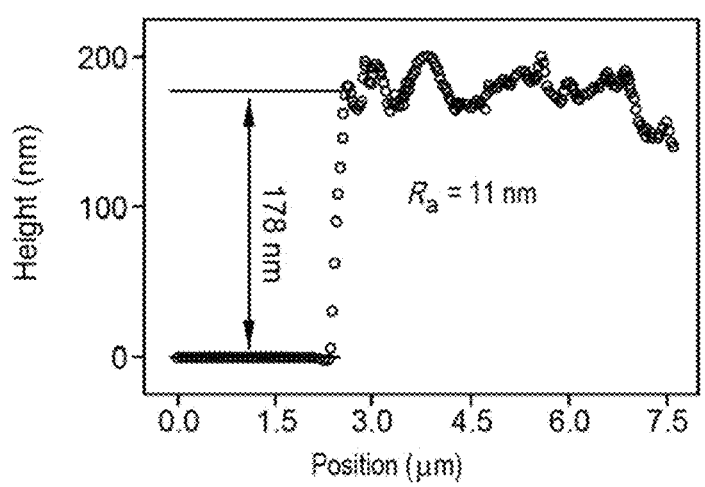
FIG. 1F illustrates an exemplary AFM height profile extracted from the dashed line of FIG. 1E according to at least one embodiment of the present disclosure.

FIG. 1E is an atomic force microscopy (AFM) height map of an example film made with ~0.030 wt % DOC, and FIG. 1F shows the AFM height profile extracted from the dashed line of FIG. 1E. As seen in FIGS. 1E and 1F, the SWCNT films are about 178±11 nm thick (uncertainty is reported as k=1 standard deviation), which is on the order of the length of one nanotube (~200 nm to ~400 nm). Nanotube film thicknesses on this order (and smaller) are often treated as 2D constructs, because of the dimensionality of their physical properties. It should be noted that the film thicknesses measured here are increased with respect to conventional methodologies, thus supporting the instant implementation's excellent global alignment over a substantial SWCNT deposition amount. From the AFM film profile, a surface roughness, Ra, of about 11 nm is also obtained.

Example 3: Filtration Flow Rate

Figure 2A:
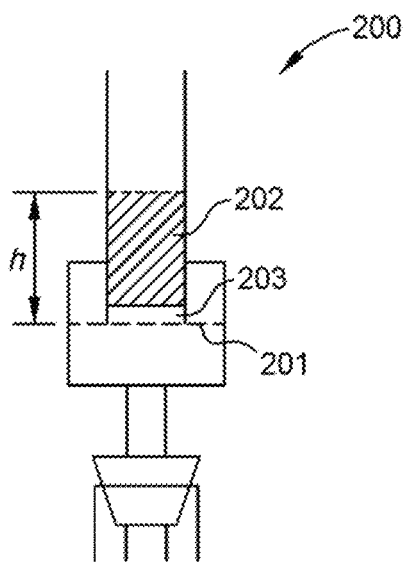
FIG. 2A is a schematic illustration of an example filtration apparatus, according to at least one embodiment of the present disclosure.

FIG. 2A is a graphical depiction of a portion of an example filtration apparatus 200, according to at least one embodiment of the present disclosure. The height, h, of the SWCNT dispersion (e.g., the height of the meniscus) is measured as a function of time, t, by a computer-monitored camera as shown in FIG. 2A. h is measured from the surface of the membrane 201 to the top of the SWCNT dispersion 202, and is used to calculate certain parameters as described herein. The cake/retentate (or SWCNT film formed during filtration) is shown as numeral 203.

Previous SWCNT alignment protocols have been unable to achieve a constant filtration flow rate, which results in a time-varying SWCNT cake (i.e., the film during filtration) deposition rate, thus hindering optimal SWCNT alignment. In order to achieve a constant filtration flow rate, which is expressed as a permeation flux, J (=flow rate/area), empirical determinations of membrane resistance, $R_m$, and cake resistance, $R_c$, were determined:

$$\frac{1}{J} = \frac{\mu(R_m + R_c)}{\Delta P}, \quad (1)$$

where μ is the viscosity of the permeate (SWCNT solution), ΔP is the transmembrane pressure, and $R_c = \alpha_{cake} C v$ with $\alpha_{cake}$ as the specific cake resistance, C the dispersion concentration, and v the filtrate volume per unit area.

Figure 2B:
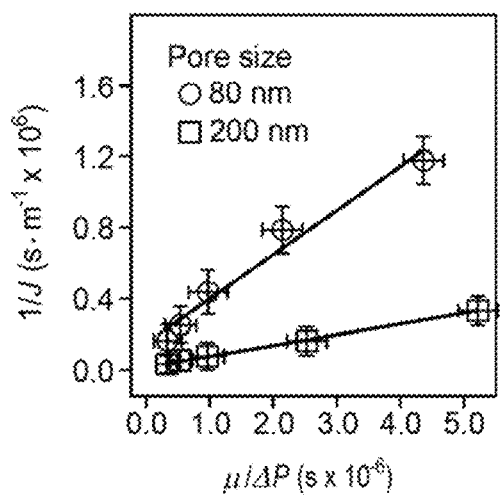
FIG. 2B is exemplary data illustrating the reciprocal of the permeation flux, J, as a function of $\mu/\Delta P$ for an 80 nm and a 200 nm pore-size membrane according to at least one embodiment of the present disclosure.
Figure 2C:
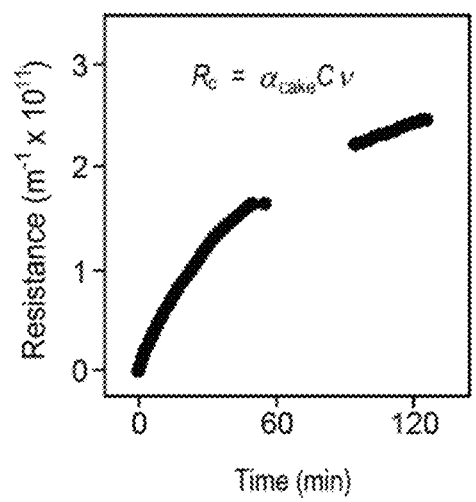
FIG. 2C is exemplary data illustrating cake resistance, $R_c$, as a function of time according to at least one embodiment of the present disclosure.
Figure 7:
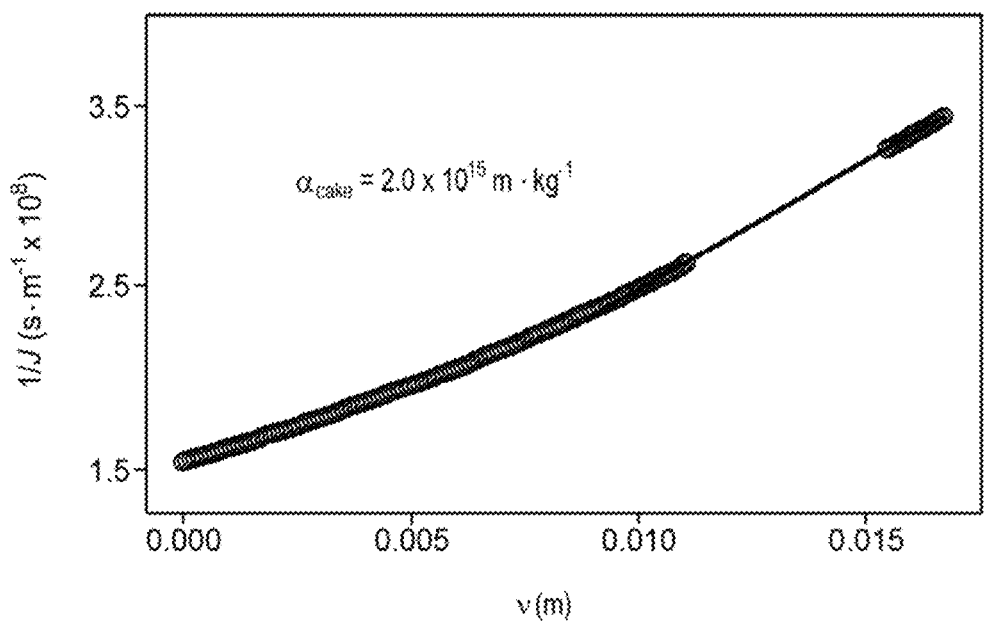
FIG. 7 shows an example determination of the specific cake resistance, $\alpha_{cake}$, from the linear fit of the reciprocal of permeation flux, J, as a function of filtrate volume per unit area, v, according to at least one embodiment of the present disclosure.

Information regarding the measurement of $\alpha_{cake}$ is discussed in relation to FIG. 7. $R_m$, which is independently measured through a controlled water filtration experiment shown in FIG. 2B, is $2.5 \times 10^{11}$ m$^{-1}$ for the 80 nm pore-size membrane and $3.8 \times 10^{10}$ m$^{-1}$ for the 200 nm pore-size membrane. While $R_m$ is nearly constant throughout the filtration process, $R_c$ increases with time as the cake is deposited, which is shown in FIG. 2C. As more SWCNTs are deposited on the membrane surface, the overall resistance to flow increases. Data is shown for an 80 nm pore size membrane and a SWCNT concentration of ~8 μg/mL. Using determinations of the time-independent $R_m$ and the time-dependent $R_c$, ΔP can be tuned throughout the film deposition to keep J constant. ΔP is the total (time-dependent) transmembrane pressure, which is the sum of the applied pressure, $P_{applied}$, and the head pressure, μgh(t), where p is the dispersion mass density, g is gravitational acceleration, and h(t) is the time-dependent solution column height.

Figure 8A:
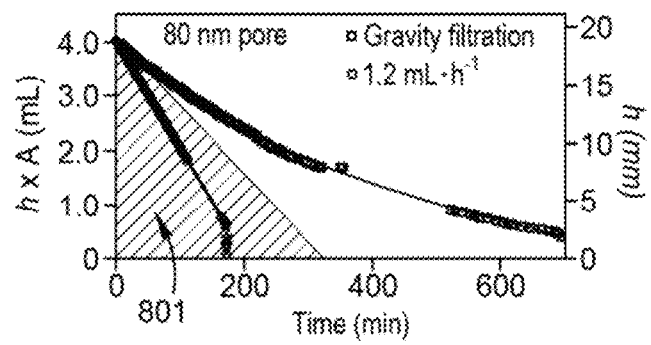
FIG. 8A shows a detailed view of the exemplary data of FIG. 2D for the membrane having an 80 nm pore size according to at least one embodiment of the present disclosure.
Figure 8C:
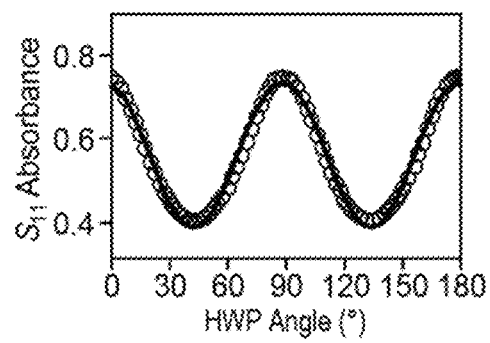
FIG. 8C shows the exemplary polarized absorbance data of the $S_{11}$ peak from the controlled flow rate films made using the membrane having a 80 nm pore size shown in FIG. 8A, according to at least one embodiment of the present disclosure.
Figure 8B:
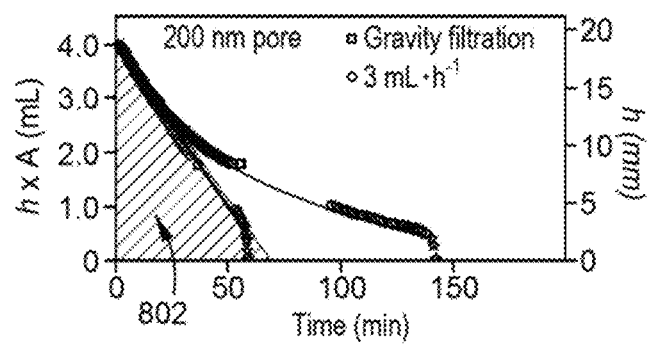
FIG. 8B shows a detailed view of the exemplary data of FIG. 2D for the membrane having a 200 nm pore size according to at least one embodiment of the present disclosure.

FIG. 2D illustrates that a constant flow rate for two membrane pore sizes (80 nm, Ex. 241; and 200 nm, Ex. 243) was achieved throughout the entire film deposition process. The gravity-driven filtration (e.g., no applied pressure; Ex. 242 and Ex. 244) curves demarcate the slowest flow rate possible in the system with a specific $R_m$, while the shaded regions 251 and 252 (for 80 nm and 200 nm pore-size membranes, respectively) indicate the possible range of flows accessible when external pressure is applied. FIGS. 8A and 8B, described below, show a more-detailed view of FIG. 2D. The high value of $R_m$ for the 80 nm pore-size membrane enables greater variability of the flow rate, but often at lower values of J. The procedures described herein, measuring $R_m$ and $R_c$ and then tuning ΔP to maintain a constant J, enables application of the parameters described herein (flow rate, DOC concentration, SWCNT concentration, etc.) to different SWCNT types (laser oven, high-pressure carbon monoxide (HiPCO), cobalt-molybdenum catalyst (CoMoCAT), arc-discharge, etc.) and membranes with differing pore sizes and materials. As such, embodiments of the disclosure greatly broaden the applicability and utility of the disclosed filtration-based alignment methods.

In FIG. 2D, the gravity filtration data and fit (black curve) denote the flow rate lower limit with a given membrane pore size. Gaps in the data are created when the meniscus goes behind the glass funnel lip, while starred points denote the film drying process where the pressure is increased to remove residual water. The stars in FIG. 2D indicate the accelerated pressure after the trigger event, when the pressure increases such that the flow rate changes as discussed above.

Several optical spectroscopic techniques are utilized to determine $S_{2D}$ for SWCNT films after the SWCNT films have been transferred to either a glass coverslip or quartz substrate (details regarding the SWCNT film transfer are described below). Since SWCNTs have a highly anisotropic absorption coefficient, a, polarized optical spectroscopic techniques were used to measure nematicity in SWCNTs. The embodiments described herein utilize polarized optical methods to determine nematicity: reduced linear dichroism, $LD^r_{2D}$, polarized Raman scattering (described in relation to FIG. 5), and birefringence ratios (described in relation to FIG. 6), whose precise formulations are described below. A guiding principle behind all three methods, however, is graphically illustrated by FIG. 2E, which shows that when the optical electric field is parallel to the SWCNT axis, the on-axis absorption coefficient, $\alpha_\parallel$, is high; in contrast, when the electric field is orthogonal to the SWCNT axis, the off-axis absorption coefficient, $\alpha_\perp$, is suppressed. In FIG. 2E, a half-wave plate (HWP) is utilized to rotate the light polarization with respect to the SWCNT alignment direction. The dashed line indicates the $S_{11}$ absorbance feature of one of the nanotube chiralities. Depending on the optical technique, either the light polarization angle is rotated using the HWP or the light polarization is kept fixed and the SWCNT film is rotated. In both techniques, $\alpha_\parallel$ and $\alpha_\perp$ are probed.

The anisotropic SWCNT absorption provides a way to measure $S_{2D}$, which, as described above, is a metric for determining alignment. A combination of polarization-specific geometries with respect to the vertically oriented SWCNT absorption axis is utilized to relate $S_{2D}$ to polarized Raman scattering measurements:

$$S_{2D} = \frac{\Delta I_{VV} - I_{HH}}{\Delta I_{VV} + I_{HH} + (1+\Delta)I_{VH}} \tag{2}$$

where $I_{XY}$ is measured scattering intensity with the incident (X) and scattered (Y) light polarization oriented vertically (V; parallel to the SWCNT axis) or horizontally (H; perpendicular to the SWCNT axis) and A is the dichroic ratio $\Delta = \alpha_\parallel / \alpha_\perp$. Reduced linear dichroism, $LD^r_{2D}$, an absorption-based technique, can also be used to measure $S_{2D}$:

$$S_{2D} = \frac{LD^r_{2D}}{2} = \frac{(\alpha_\parallel - \alpha_\perp)}{\alpha_\parallel + \alpha_\perp} \tag{3}$$

The measurement method affects the value of $S_{2D}$ in SWCNTs. As an example, $S_{2D}$ measured via optical absorption-based methods, such as $LD^r_{2D}$, can significantly underestimate SWCNT alignment due to wavelength-dependent features, such as non-excitonic absorption and cross-polarized optical transitions. Although absorption-based measurements of $S_{2D}$ are valuable, especially for relative comparisons, the alignment values obtained from these techniques represent the minimal degree of SWCNT film alignment averaged over a millimeter-sized area. This disparity in $S_{2D}$ measured using different techniques (polarized Raman scattering versus $LD^r_{2D}$) is clearly shown in FIG. 1D. Given the significantly reduced effect of non-axial SWCNT spectroscopic features, polarized Raman is utilized to determine $S_{2D}$ when possible. Terahertz spectroscopy can also be used to determine nanotube alignment, and is another background-less technique that achieves highly accurate values of nematicity.

FIG. 2F compares normalized, polarized $S_{11}$ absorption spectra of example films made with the 200 nm pore membrane using a constant flow rate of 3 mL/h or gravity filtration. Although the $S_{11}$ absorption used to calculate $LD^r_{2D}$ includes both SWCNT and non-SWCNT components that are not related to excitonic transitions (thus, underestimating the true value of $S_{2D}$), it is clear from this figure that greater alignment (a higher $LD^r_{2D}$ value) is achieved when the flow rate is fixed. Thus, in addition to improving reproducibility and enabling the generalization of parameters to other SWCNT types, precise control of the pressure to make the flow rate constant can also significantly enhance SWCNT nematicity.

Example 4: Meniscus Flattening

Along with flow-rate control, effects in SWCNT films created by the meniscus of the SWCNT dispersion during filtration are able to be detected and addressed by embodiments described herein. Specifically, spatially-resolved polarized optical techniques, such as birefringence and polarized Raman scattering mapping, are utilized. Such optical techniques reveal the presence of a radial SWCNT alignment on the front surface of the films (the side that faces upward during filtration). This type of alignment, at least in three dimensions, is known as a spherulite and is commonly observed in films of 1D crystals when the solution meniscus combs (or drags) across the film surface, which produces a force director that radially polarizes the crystals.

FIG. 3A and FIG. 3D clearly show the radial alignment on the surface of SWCNT films due to meniscus combing during the final stages of filtration. Such a feature is referred to herein as a 2D spherulite. FIG. 3D additionally shows the lack of global alignment across the front surface of the SWCNT film. FIG. 3C is an illustration of the radial alignment of the example SWCNTs (and uneven cake deposition) created by meniscus combing at the end of the filtration process. The arrows 310a, 310b indicate the radially-aligned force directed at the cake surface. To remove this meniscus-created radial orientation, the hydrophobicity of the filtration glassware was increased using a silanation procedure (see FIGS. 9A-9C and the associated text below). This technique significantly flattens the meniscus and prevents it from dragging across the SWCNT cake at the end of the filtration as shown in FIG. 3C.

FIG. 3B and FIG. 3E show the results of flat-meniscus filtration. In stark contrast to traditional SWCNT alignment methods, the nanotubes on both sides of the film are well ordered. (FIG. 10 and FIG. 11, described below, show Raman maps of both front and back film surfaces). The high degree of SWCNT alignment over a large area and the distinct lack of 2D spherulite formation provide strong evidence that the meniscus flattening eliminates, or at least mitigates, SWCNT radial polarization. Advantageously, the double-sided alignment extends across large distances, which demonstrates global SWCNT nematic ordering.

Depending on the thickness of the SWCNT film, the skin depth of the optical probe, and whether the probe measures reflection or transmission, the use of polarized optical spectroscopy may not unambiguously detect the presence of a 2D spherulite. For example, after the film is transferred from the membrane to a substrate, the front film surface during filtration is now the back film surface for optical measurements, which may not always be as well measured as the front surface.

Figure 3F:
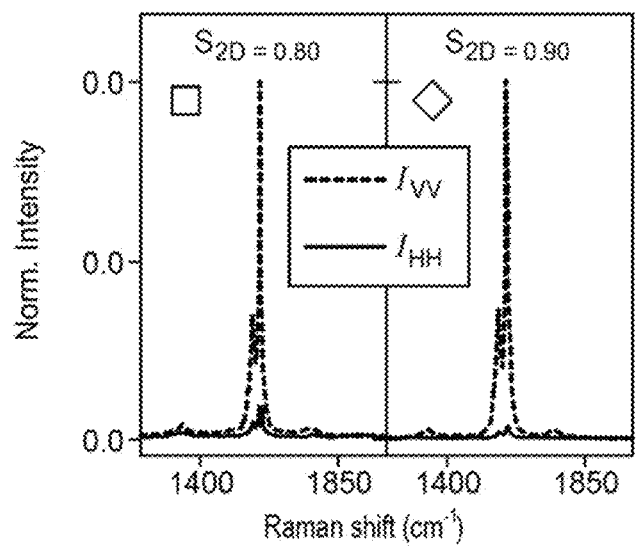
FIG. 3F is exemplary polarized Raman spectra of example films of FIG. 3A (left panel) and FIG. 3B (right panel) according to at least one embodiment of the present disclosure.
Figure 3G:
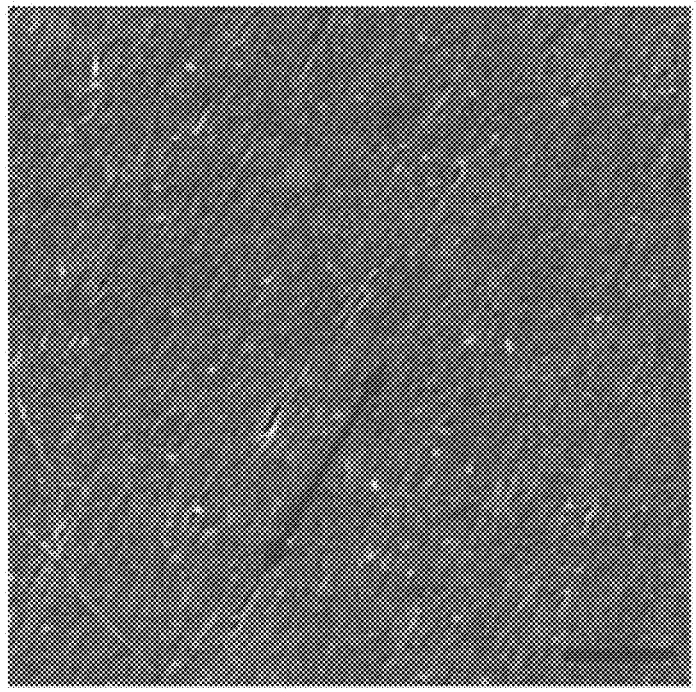
FIG. 3G is an exemplary scanning electron microscopy image of an example SWCNT film made with 0.03 wt % DOC (scale bar: 500 nm) according to at least one embodiment of the present disclosure.

FIG. 3F shows exemplary polarized Raman spectra of the example films of FIG. 3A (left panel) and FIG. 3B (right panel). $I_{VV}$ is an intensity of the G band measured with the incident and scattered light both polarized along the SWCNT film axis, while $I_{HH}$ is an intensity of the G band measured with the incident and scattered light polarized perpendicular to this axis. FIG. 3F (as well as FIG. 10C described below) captures the non-obvious signature of the 2D spherulite behavior. Although $S_{2D}$ increases when the 2D spherulite is removed through silanation of the glassware, the effect on the measured nematicity is insignificant. Careful spatial mapping of both SWCNT film surfaces reveals the radial polarization and the lack of global ordering. The high degree of alignment across the non-spherulite film is additionally supported through direct imaging techniques like scanning electron microscopy (SEM). The SEM image shown in FIG. 3G (with arrows indicating the alignment axis) clearly indicates excellent SWCNT alignment.

Meniscus flattening can be measured in terms of the meniscus-to-glass angle. The meniscus, as described above, is a concave or convex meniscus created in the aqueous solution above the membrane while inside the glass element (e.g., funnel). Silanation of the glass element improves meniscus flattening. In some embodiments, the meniscus-to-glass angle of the silanated glass element is about 75° or more, 75° to about 105°, such as from about 80° to about 100°, such as from about 85° to about 95°, such as from about 85° to about 89° or from about 91° to about 95°, or about 90°. In at least one embodiment, the meniscus-to-glass angle ranges from $angle_1$ to $angle_2$, where each of $angle_1$ and $angle_2$ are independently about 75°, about 76°, about 77°, about 78°, about 79°, about 80°, about 81°, about 82°, about 83°, about 84°, about 85°, about 86°, about 87°, about 88°, about 89°, about 90°, about 91°, about 92°, about 93°, about 94°, about 95°, about 96°, about 97°, about 98°, about 99°, about 100°, about 101°, about 102°, about 103°, about 104°, or about 105°, so long as $angle_1 < angle_2$.

Example 5: Membrane Effects on Nanotube Alignment

Figure 4A:
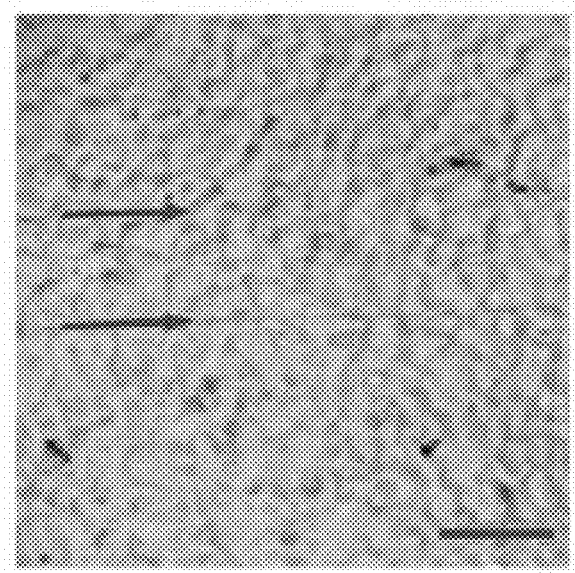
FIG. 4A is an exemplary microscope image of an example membrane utilized for the filtration process (scale bar: 250 μm) according to at least one embodiment of the present disclosure.
Figure 4B:
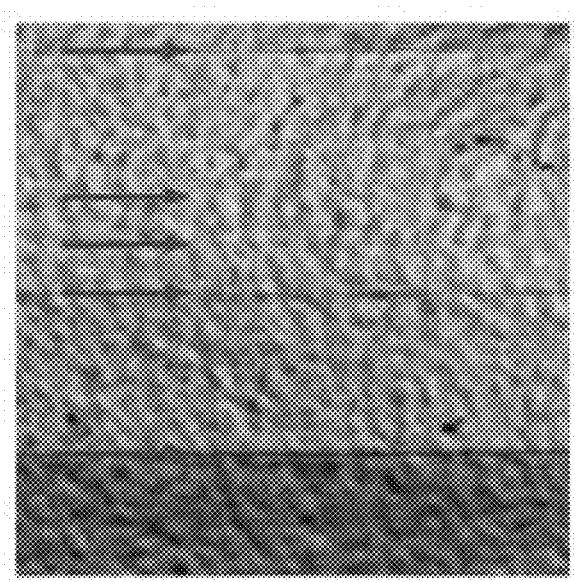
FIG. 4B is an exemplary microscope image of an example membrane illustrating that groove density is increased when the membrane surface in FIG. 4A is swept with an ethanol-wetted wipe, according to at least one embodiment of the present disclosure.

FIG. 4A shows grooves (designated by the arrows) in the filter membrane created during the membrane manufacturing process. Although these grooves are not uniformly spaced or appropriately sized for the nanotubes utilized, the grooves were further analyzed to determine the groove's potential impact on nanotube alignment. To help address what impact, if any, the grooves play in nanotube alignment, the grooves were augmented by sweeping an organic solvent-wetted wipe across the top surface of the filter membrane along the initial groove direction (FIG. 4B) prior to filtration. As described below in relation to FIG. 12, an organic solvent-wiped filter membrane increases the SWCNT film alignment considerably going from a $S_{2D}$ of 0.26 to 0.52. Illustrative, but non-limiting, examples of organic solvents include an alcohol solvent, such as ethanol and/or isopropanol. Sweeping the filter membrane with a wipe wetted with water and a wipe wetted with an organic solvent was used to, e.g., distinguish between whether the increased membrane grooving or electrostatic charging (or both) are primarily responsible for the enhanced SWCNT nematicity. The results indicated that $S_{2D}$ increased from 0.27 for the SWCNT film made from water-wiped membrane to 0.42 with the organic solvent-wiped membrane. This enhancement indicates that ordered charging, instead of mechanical grooving, is responsible for increased SWCNT alignment. A similar increase in SWCNT alignment was observed in self-assembled SWCNT nanowires when the glass substrates were directionally wiped with ethanol.

Figure 4C:
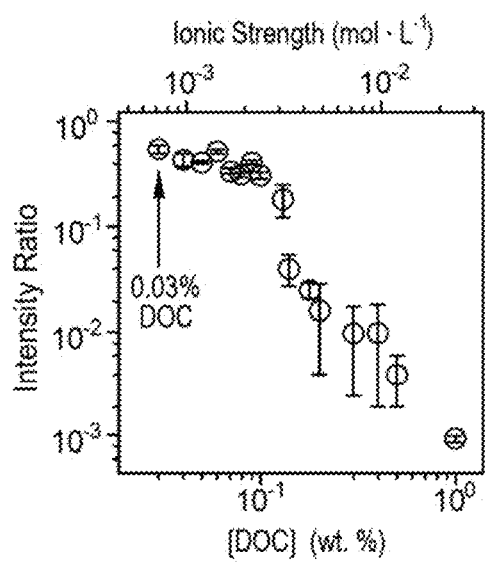
FIG. 4C is exemplary data illustrating the birefringence intensity ratio of an example SWCNT film under increasing DOC concentrations according to at least one embodiment of the present disclosure.
Figure 4D:
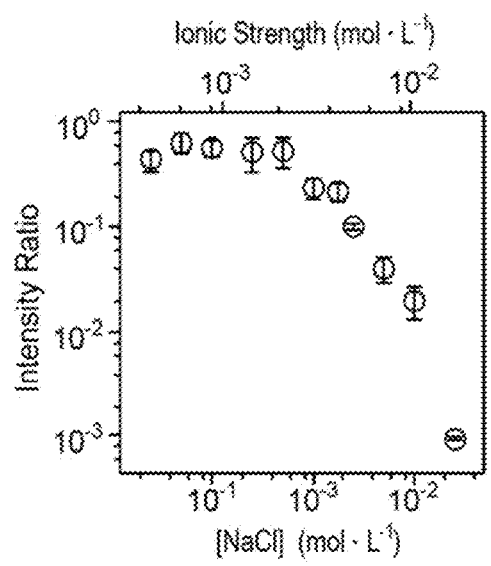
FIG. 4D is exemplary data illustrating the birefringence intensity ratio of an example SWCNT film under increasing NaCl concentrations according to at least one embodiment of the present disclosure.

Along with charging the membrane, inter-SWCNT electrostatic interactions are another factor impacting $S_{2D}$. The DOC concentration of the SWCNT solution strongly impacts the achievable $S_{2D}$ (FIG. 4C) because the Debye interaction length between SWCNTs decreases with increasing DOC coverage of the nanotube. The measured $S_{2D}$ scaling with DOC concentration strongly guided utilization of solutions with ~0.03 wt % DOC concentration, which is over an order of magnitude below the critical micelle concentration. As shown by the data in FIG. 3D, using NaCl to tune the ionic strength confirmed that as the tube-tube electrostatic interactions decrease due to increased screening, the SWCNT nematicity is reduced.

Figure 4E:
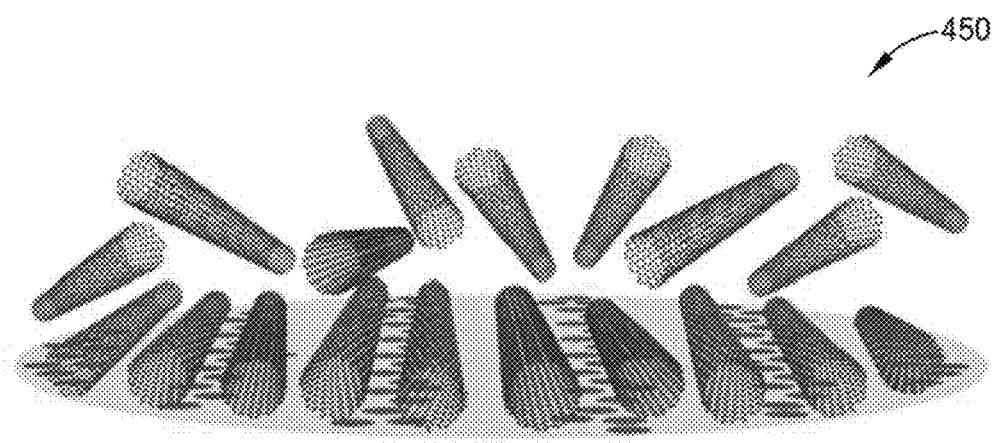
FIG. 4E is an exemplary graphical depiction of a proposed model for ordered SWCNT formation according to at least one embodiment of the present disclosure.

The strong role played by directional tribocharging and inter-tube electrostatics suggest that linear arrays of charges are accumulating on the membrane, as shown by the proposed model 450 for ordered SWCNT formation depicted in FIG. 4E. Here, charges puddle on the filtration membrane in quasi-linear chains created by intentional wiping. The electrostatic fields, in competition with the complex electrostatic inter-nanotube environment, compete to produce an aligned SWCNT phase on the membrane. Thus, although mechanical membrane grooves may play a minor role in nanotube alignment, the large size of the grooves, lack of groove uniformity, and the groove's relative irregularity all indicate that the grooves are not directly responsible for SWCNT alignment. Instead, it is believed that the wiped filter membranes acquire a small net charge that is linearly arranged, which in combination with tube-tube interactions, creates alignment along a common axis. Given the estimated net charge magnitude on the filter membrane, it is believed that the charge-directed alignment can be destroyed, as seen by small changes in the ionic strength of the SWCNT solution.

Example 6: Polarization-Sensitive Optical Characterization

As described herein, different polarized methods were used, including linear dichroism, spatially-resolved Raman spectroscopy, and birefringence microscopy.

Polarized Absorbance. In embodiments employing polarized absorption, the anisotropic absorbance of SWCNTs is utilized to quantify $S_{2D}$. Since the absorption coefficient of a J=±1 ($V_i \leftrightarrow C_i$) excitonic transition, α, is fully realized when the incident optical field is parallel to the SWCNT, two absorption coefficients, $α_{\|}$ and $α_{\perp}$, can be defined, corresponding to the two physical extremes of the incident field parallel and perpendicular, respectively, to the SWCNT axis. 2D-reduced linear dichroism, $LD^r_{2D}$, is used to estimate the two-dimensional nematic order parameter, $S_{2D}$. $LD^r_{2D}$ is defined as:

$$LS^r_{2D} = \frac{(2α_{\|} - α_{\perp})}{α_{\|} + α_{\perp}}, \quad (4)$$

where $$S_{2D} = \frac{LD_{2D}^r}{2} = \frac{(\alpha_\| - \alpha_\perp)}{\alpha_\| + \alpha_\perp}. \quad (5)$$

Spatially-Resolved Polarized Raman Spectroscopy. In measuring spatially-resolved polarized Raman spectroscopy, a five-axis stage is used. Three of the axes are controlled via linear actuators, while the other two axes are used to adjust the pitch and yaw to correct for sample tilt. For spatial mapping, points were collected in ~50 μm steps over a 3 mm×3 mm area. A Mitutoyo, long-working distance, 50× objective with an estimated spot size of ~1 μm is used to focus and collect Raman scattering from a 532 nm continuous-wave excitation source. Spectra were resolved on a 750 nm blazed, 1200 grooves/mm grating using a 320 mm Isoplane™ spectrometer and a liquid nitrogen cooled silicon charge coupled device (Si CCD) camera (all from Princeton Instruments).

To determine $S_{2D}$ using polarized Raman spectroscopy, the following equation is used:

$$S_{2D} = \frac{\Delta I_{VV} - I_{HH}}{\Delta I_{VV} + (1+\Delta)I_{VH} + I_{HH}} \quad (6)$$

where $I_{VV}$, $I_{VH}$, $I_{HH}$ are integrated intensities of the G band, and $\Delta$ is the dichroic ratio $\Delta = A_\|/A_\perp$. VV, VH, and HH define the orientation of the incident and analyzed polarization with respect to the SWCNT alignment axis, respectively. The orientations are either parallel, parallel (VV); parallel, perpendicular (VH); or perpendicular, perpendicular (HH).

When carrying out this measurement, the stage is moved to an initial starting point, (0,0), where a polarized absorption measurement is taken. This measurement includes rotating a half-wave plate (HWP), thus changing the orientation of the incident linear polarization to determine the SWCNT alignment axis, as well as to measure A. The two angles of the HWP that yield $A_\|$ and $A_\perp$ are then used as the positions that define the incident polarization orientations for scanning over the sample. Before starting the 2D scan over the sample, the incident power is measured at the sample for both angular positions and is then held constant for the duration of the measurement.

Results from this method can be seen in FIGS. 5A-5F where the individual 2D maps ($I_{VV}$, $I_{VH}$, and $I_{HH}$) show the integrated intensity of the G-band for the calculation of $S_{2D}$ for FIGS. 3D and 3E. The radial polarization causing the formation of the 2D spherulite can be distinguished in the $I_{VH}$ map of the SWCNT film. In addition, FIGS. 5D-5F show that the alignment is highly uniform over a 9 mm² area.

Figure 6A:
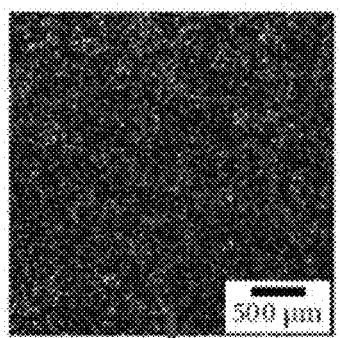
FIG. 6A is an exemplary image from cross-polarized microscopy showing a contrast-enhanced image of the example film in a parallel alignment orientation with respect to the incident polarization according to at least one embodiment of the present disclosure.
Figure 6B:
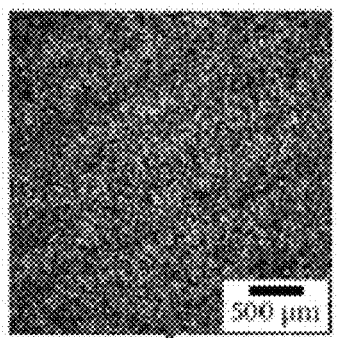
FIG. 6B is an exemplary image from cross-polarized microscopy showing a contrast-enhanced image of the example film in a perpendicular alignment orientation with respect to the incident polarization according to at least one embodiment of the present disclosure.
Figure 6C:
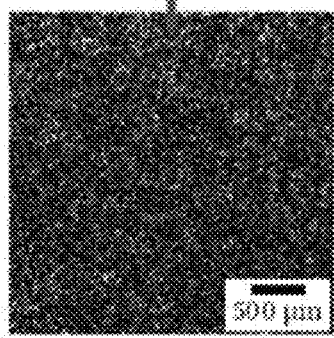
FIG. 6C is an exemplary gray scale image of FIG. 6A where an average pixel intensity is calculated and used to determine an intensity ratio, $I_R$, according to at least one embodiment of the present disclosure.
Figure 6D:
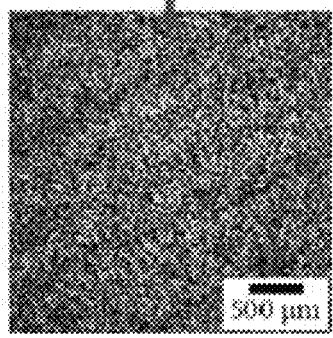
FIG. 6D is an exemplary gray scale image of FIG. 6B where an average pixel intensity is calculated and used to determine an intensity ratio, $I_R$, according to at least one embodiment of the present disclosure.

Polarized Microscopy and the Birefringence Intensity Ratio. Birefringence microscopy provides a fast characterization technique that can be used to accurately estimate $S_{2D}$. The images acquired via this technique are shown in FIGS. 6A-6D. Specifically, the cross-polarized microscopy images in FIG. 6A and FIG. 6B show contrast-enhanced images of the film in parallel and perpendicular alignment orientations, respectively, with respect to the incident polarization. These images (without contrast enhancement) shown in FIG. 6A and FIG. 6B are then converted to gray scale images, FIG. 6C and FIG. 6D, respectively, where pixel values range from 0 to 1. Using these gray scale images, an average pixel intensity is then determined for the image from which a ratio, $I_R$, can be calculated:

$$I_R = 1 - \frac{I_{dark}}{I_{bright}}, \quad (7)$$

where $I_{bright}$ corresponds to the average pixel intensity of the image collected from the VH HV case, and $I_{dark}$ corresponds to the average pixel intensity of the image collected from a 45-degree rotation of the sample.

This intensity ratio can then be used to estimate the overall alignment of the film in both reflection and transmission. One benefit of using this method is the ability to accurately measure $S_{2D}$ without transferring the film to a substrate; that is, measurements can be performed while the film is still on the membrane. For the set of images shown in FIGS. 6A-6D, $I_R$ was determined to be about 0.71, indicating that there is a relatively high degree of alignment in this region of the film. For films that do not exhibit any alignment, $I_R$ values are found to be well below about 0.1, indicating the accuracy of the methodologies described herein.

Example 7: Flow Rate Control

As described herein, creating a constant flow rate increases SWCNT alignment using small pore-size diameter membranes (e.g., pore sizes from about 80 nm to about 200 nm). Since different SWCNTs pack differently into the film, and one of the benefits of this method is that dispersions can be chirally separated prior to filtration, being able to control the flow rate without having to monitor drip rates enables quick tuning of the flow rate to achieve high, global degrees of alignment. Any suitable method of chiral separation can be used prior to filtration.

To control the flow rate, the resistance to filtration caused by the membrane, $R_m$, is first determined. For this determination, Equation 1 is used:

$$\frac{1}{J} = \frac{\mu(R_m + R_c)}{\Delta P} = \frac{\mu(R_m + \alpha_{cake}Cv)}{\Delta P}, \quad (8)$$

where J is the permeation flux, μ is the viscosity of the permeate (SWCNT solution), $\alpha_{cake}$ is the specific cake resistance, C is the slurry concentration, v is the filtrate volume per unit area, and $\Delta P$ is the sum of applied pressure, $P_{applied}$, and the head pressure, P head, which is equal to $\rho g h(t)$, where ρ, g, and h(t) are the density, acceleration due to gravity, and the height of the meniscus, respectively. The cake resistance, $R_c$, is used as a substitution in this equation such that $R_c = \alpha_{cake}Cv$.

In one example, utilized to determine the measured membrane resistance, $R_m$ (FIG. 2B), about 4 mL of water was run through the filtration system at a constant pressure at room temperature. For this condition, and since no cake (e.g., retentate) is being formed in this process ($R_c$=0), Equation 8 then becomes $$\frac{1}{J} = \frac{\mu R_m}{\Delta P} \quad (9)$$

Data is collected by tracking the height of the meniscus as a function of time, h(t), which is used for determining the volume [=h(t)×A] and $P_{head}$ [∝ h(t)], where A is the filter area (~2.18 cm²). This process is repeated for a number of different ΔP values and then plotted, as shown in FIG. 2B. From this data, the value of $R_m$ for both the 80 nm and 200 nm pore size membranes can be extracted. The value of $R_m$ is equal to about $2.5 \times 10^{11}$ m$^{-1}$ for the 80 nm pore-size membrane and about $3.8 \times 10^{10}$ m$^{-1}$ for the 200 nm pore-size membrane.

To determine the specific cake resistance, $\alpha_{cake}$, a similar process is carried out. However, instead of using water, a SWCNT dispersion with a DOC concentration of about 0.03 wt %, a SWCNT concentration of about 8 μg/mL (estimated via optical density), and a constant applied pressure at about room temperature are used. Due to the fact that such low surfactant and SWCNT concentrations are used, it is assumed that the viscosity is very near that of water (about $8.9 \times 10^{-4}$ Pa·s) at about room temperature. In this example, the collected data is plotted as the reciprocal of the permeation flux as a function of permeate volume per unit area, as shown in FIG. 7. From Equation 8, the slope of the best fit line is directly proportional to $\alpha_{cake}$. The fit is taken in the most linear region, near the end of the data set, since in the beginning of the filtration process there is little to no cake formed on the membrane. Therefore, the cake-filtration regime does not occur until nearly the end of the filtration process. $\alpha_{cake}$, as calculated by this method, is about $2.0 \times 10^{15}$ m/kg.

This value for $\alpha_{cake}$ is the first report of specific cake resistance for SWCNTs. Since no $\alpha_{cake}$ values for SWCNTs are available, specific cake resistances from multi-wall carbon nanotubes (MWCNTs) are used as a means of comparison. Notably, $\alpha_{cake}$ for SWCNT is an order of magnitude larger than $\alpha_{cake}$ for MWCNT, a difference likely due to the high-density packing of SWCNTs compared to MWCNTs afforded by the smaller SWCNT diameters. The increased packing results in a low cake porosity and thus a higher $\alpha_{cake}$ value. Additionally, there is a significant change in $\alpha_{cake}$ between rate zonal- and semiconductor-sorted SWCNTs observed, which may be due to differences in average diameters of the SWCNTs and MWCNTs.

Figure 8D:
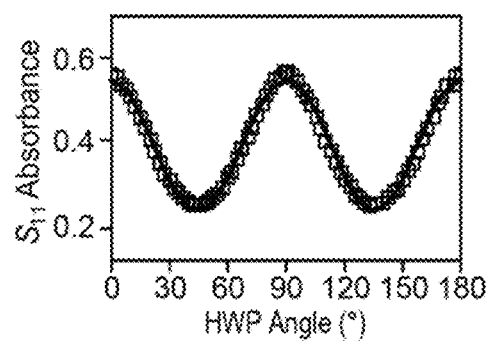
FIG. 8D shows the exemplary polarized absorbance data of the $S_{11}$ peak from the controlled flow-rate films made using the membrane having a 200 nm pore size, shown in FIG. 8B, according to at least one embodiment of the present disclosure.

From the values found for $R_m$ and $\alpha_{cake}$, a desired v as a function of time is then fed into the model where the necessary $P_{applied}$ to achieve a constant J is calculated. Experimental results from this method are shown FIG. 8A and FIG. 8B, where the model produces the desired flow rates of about 1.2 mL·h$^{-1}$ and about 3 mL·h$^{-1}$, respectively. Specifically, FIGS. 8A and 8B show the exemplary data from FIG. 2D for the 80 nm pore-size membrane and the 200 nm pore-size membrane. The membrane having a smaller pore size has a higher $R_m$, which enables the exploration of a greater range of flow rates. The shaded regions, referred to as 801 and 802, like regions 251 and 252, again indicate flow rates that are accessible with the 80 nm pore-size membrane and the 200 nm pore-size membrane, respectively. The breaks in the data in both FIGS. 8A and 8B is due to the lip of the filtration funnel. When the trigger event occurs, the pressure is increased such that the flow rate falls from about 10 mL/h to about 15 mL/h. This accelerated pressure is indicated with stars in FIGS. 8A and 8B. FIGS. 8C and 8D show the exemplary polarized absorbance data of the $S_{11}$ peak from the controlled flow-rate films made using the 80 nm pore-size membrane and 200 nm pore-size membrane, respectively, in FIGS. 8A and 8B. FIGS. 8C and 8D demonstrate that the films formed at such conditions are well aligned, and the $S_{2D}$ value can be calculated from such data.

Example 8: Transfer of SWCNT Films to a Substrate

Transfer of the SWCNT films is performed in order to carry out transmission optical measurements. In some embodiments, the SWCNT film is transferred from the nanoporous membrane to an optically transparent or semi-transparent substrate according to the following non-limiting procedure.

Once the film has been dried with the accelerated flow rate, the film dries in air until the residual liquid has evaporated, a process that typically takes a few hours for the scale described herein. It is contemplated that the examples described herein may be scaled to commercial or industrial scale utilizing suitable apparatus and methodologies. The film is then placed film side down on the surface of water to float in a Petri dish. Depending on the measurement, a glass cover slip is used as the optically transparent or semi-transparent substrate. The substrate is submerged in the water and placed under the film on the film surface. Prior to submersion, the substrate is first rinsed in a first organic solvent (e.g., ethanol) and then in water (e.g., filtered water). The film is floated onto the surface of the substrate and removed from the Petri dish. Excess water is removed from the substrate, by shaking the substrate or another method, and the film and substrate are set to dry in air (e.g., for about two hours or more, such as about 2 hours to about 15 hours, such as from about 2 hours to about 8 hours) until the membrane has sufficiently adhered itself to the substrate surface.

A corner of the membrane is then slightly lifted to get a wash bottle tip under the membrane. A wash bottle tip with a second organic solvent (e.g., chloroform) is then placed underneath the lifted corner and second organic solvent is lightly sprayed under the film. This operation permanently adheres the film to the substrate surface. The second organic solvent is then introduced, e.g., sprayed, over the top of the membrane until the majority of the membrane has dissolved. The film and substrate are then submerged in a liquid bath comprising the second organic solvent (e.g., chloroform) and soaked for about 10 minutes at room temperature and removed from the bath. A cotton swab wetted with DOC (e.g., ~4 wt % DOC) is used to remove excess SWCNT from around the substrate. A final rinse with the second organic solvent is used to remove residual membrane. The film is lightly rinsed with a third organic solvent (e.g., acetone) to check for residual membrane and then rinsed with water and blow dried with dry air. Residue (e.g., clumps) may remain on the back of the substrate. The residue can be removed with a DOC-wetted cotton swab.

This reproducible method for transferring SWCNT films enables the film to remain intact. From other methods that have been attempted, it is very difficult to keep the film entirely adhered to the substrate in a reproducible manner. While a risk still remains that the film detaches in places, causing rips or holes in the films, partial detachment is greatly reduced with this transfer method described herein.

Other film transfer methods were also tested. For instance, when films were submerged in either N-methylpyrrolidone (NMP) or chloroform, especially using glass substrates, pockets of gas formed at the interface of the film and substrate. After the membrane had been significantly removed, these pockets rupture leaving large gaps in the films, making a majority of the area unusable for further experiments. One difference found between the use of NMP and chloroform was the rate at which the membrane dissolves. In chloroform, the reaction is very fast, while in NMP (at room temperature), the reaction is much slower. The reaction rate appears to be slightly slowed by the ethanol preservative found in most commercially-available chloroform, and this slowed rate can be beneficial in preserving the film during the transfer process.

Example 9: Silane Treatment of Glassware

As discussed above, meniscus combing on the surface of the SWCNT film was shown to prevent global SWCNT alignment. Meniscus combing can occur in a number of different ways. Depending on the surfactant concentration, as well as the final filtration speed, concentric rings form, seemingly following the meniscus. As the meniscus contacts the SWCNT film, a circle forms on the surface of the film where the liquid in the meniscus has already been pulled through the membrane and film leaving a visible, nearly dry area when viewed from a top-down perspective. As filtering continues, this dry, circular area grows in a radial manner, pulling the top layer of the SWCNT film with it. This pinning of the meniscus to the SWCNT film is believed to result in 2D spherulite formation.

Various methods to prevent meniscus combing were performed, including increasing and decreasing the accelerated final flow rate, adjusting the initial temperature of the SWCNT dispersion (to either increase or decrease the viscosity of the dispersion), and changing the surfactant concentration (to again increase or decrease the viscosity of the dispersion). Although these methods produced some results, either concentric rings still formed in the film or a radial polarization of SWCNTs emerged in the upper film layer. Silane treatment, as described below, performed better at preventing, or at least mitigating, meniscus combing.

Figure 9A:
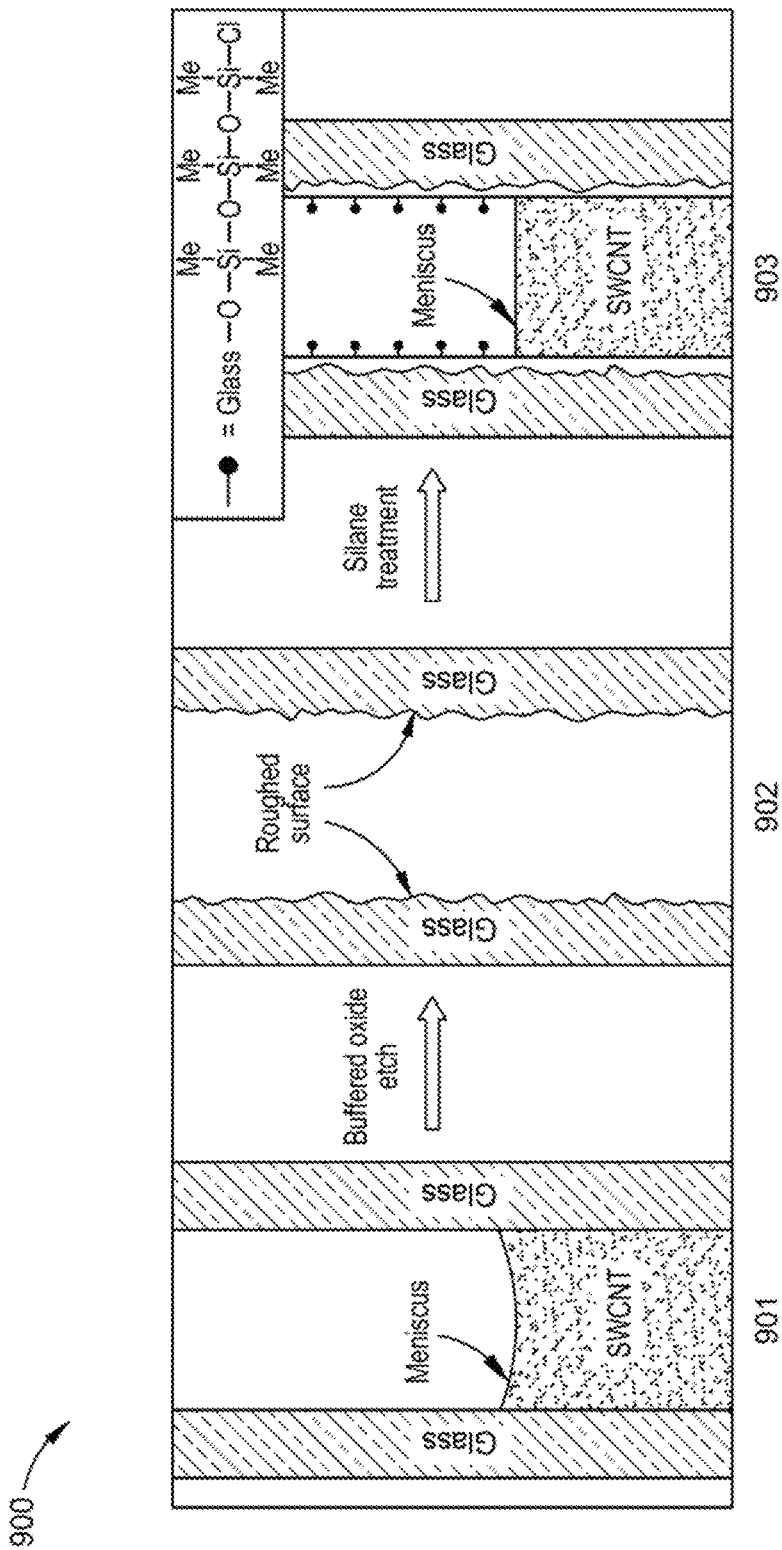
FIG. 9A, from left to right, depicts an example silanation process of glassware, according to at least one embodiment of the present disclosure.

To eliminate the meniscus combing problem directly, meniscus flattening was performed using a silane treatment of the glass filtration funnel used for the filtration apparatus (e.g., glass element 106). This methodology effectively coats the surface of the glass funnel with a short polymer of dimethylsiloxane and produces a super-hydrophobic surface inside the funnel. FIG. 9A shows a step-by-step schematic 900 of the silanation process. Specifically, FIG. 9A shows the funnel prior to silane treatment 901 (with meniscus indicated). The untreated glass funnel is etched using a buffered oxide etchant to provide glass funnel 902 having a roughed surface. Next, the glass funnel is reacted with a silanization solution, which attaches silanol (inset) to the surface of glass funnel 903 (with a flattened meniscus indicated).

In some embodiments, a silane treatment is performed by the following illustrative, but non-limiting, procedure.

(a) Clean the glass surface of the funnel. The glass surface is rinsed with an organic solvent (e.g., acetone) and $H_2O$. After rinsing, dry air is flowed onto the glass surface to, e.g., mitigate any evaporative residue caused by the organic solvent. The funnel is then rinsed thoroughly with filtered water (e.g., nano-pure $H_2O$) and again blow dried with dry air.

(b) Chemically etch the glass surface. For etching, a buffered oxide etchant (e.g., 10:1 ammonium diflouride) is used at about room temperature. Other suitable oxide etchants can be used. A plastic beaker is placed on a stir plate with magnetic stir bar and the funnel is submerged for three minutes and removed, followed by sufficient water rinsing. This operation, e.g., roughens the glass surface at the micron level, increasing the total surface area for a more effective silane treatment.

(c) Glass steam treatment. A steam treatment is then utilized to incorporate more $H_2O$ into the glass. Since the $H_2O$ molecules in the glass are one of the reactants in the process, the steam treatment operation is helpful in obtaining a long-lasting silane treatment. The steam treatment is performed using a hot plate, a bell jar, and a beaker of $H_2O$ (500 mL of $H_2O$). The beaker, along with the funnel, are placed on the hot plate and covered with the bell jar, while the beaker is in direct contact with the hot plate and the funnel is placed on an insulating block. Heat is applied to boil the water and to create a steam bath inside the jar. The water is heated until the water is evaporated. Once the water has completely evaporated, the funnel is allowed to cool back to about room temperature before beginning the next operation.

(d) Silane reaction. The glass funnel is placed inside a vacuum desiccator along with a cleaned petri dish with ~3 mL of ~5 wt/v % dimethyldichlorosilane ($C_2H_6Cl_2Si$) in heptane solution. Other suitable silanes and silane solutions can be used. The weight/volume percent can vary depending on the silicon-containing reactant used, such as from about 1 wt/v % to about 30 wt/v %, such as from about 2 wt/v % to about 20 wt/v %, such as from about 3 wt/v % to about 15 wt/v %, such as from about 4 wt/v % to about 10 wt/v %. The desiccator is then connected to a vacuum pump, and a vacuum is applied until the silane solution boils. The chamber is sealed, the vacuum pump is removed, and the silane reaction is run for a time period of about 6 h to about 24 h, or until the reaction is sufficiently complete.

(e) Glassware final cleaning. After the reaction has had a sufficient amount of time to occur, the desiccator seal is broken and left open for a few minutes while any remaining silane vapors evacuate the chamber. Upon removing the funnel, the funnel is rinsed in $H_2O$ to remove any reactive chlorosilane ends of the polymer formed from the reaction. The funnel is then cleaned with an organic solvent (e.g., an alcohol solvent, e.g., methanol).

Figure 9B:
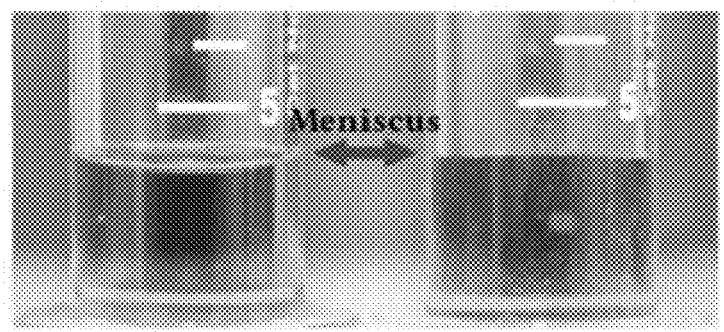
FIG. 9B shows exemplary images of a meniscus inside the filtration funnel before silane treatment (left) and after (right) silane treatment according to at least one embodiment of the present disclosure.
Figure 9C:
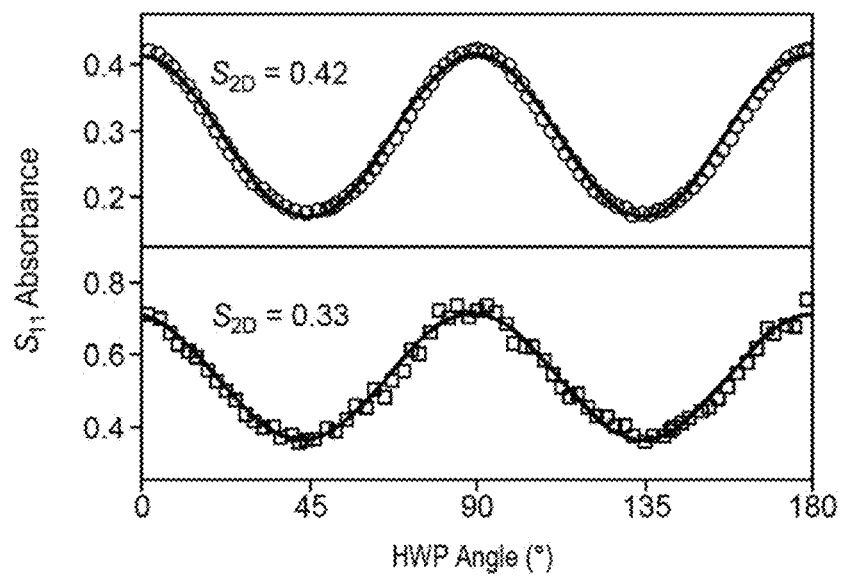
FIG. 9C shows exemplary polarized absorbance data taken at the $S_{11}$ peak of an example film made with silane-treated glassware (top panel) and an example film made without silane-treated glassware (bottom panel) according to at least one embodiment of the present disclosure.

A clear difference is observed in the meniscus before and after silane treatment. As seen in FIG. 9B, the image of the meniscus in the funnel prior to silanation, and the meniscus in the same funnel taken after the silane treatment has been completed. The volume in both images is equivalent (4 mL). FIG. 9B shows a distinct difference in the meniscus before (left) and after (right) the silane treatment. Green food dye was added to the water to act as a contrasting agent for the photos, and the volume in both images is equivalent (4 mL). FIG. 9B clearly shows the flattened meniscus as a result of the silane treatment described herein. FIG. 9C shows exemplary polarized absorbance data taken at the $S_{11}$ peak of an example film made with (top) and without (bottom) silane-treated glassware, according to at least one embodiment of the present disclosure. The data of FIG. 9C illustrates that the nanotubes align better using silane-treated glassware.

As described above, meniscus combing in non-silanated glassware affects the top side of the aligned SWCNT film. Because of the film transfer process, the radial SWCNT alignment ends up on the back side of the SWCNT film when placed on a spectroscopically-appropriate substrate. Here, it is shown that the radial alignment of the SWCNTs created by meniscus pinning does not extend to the other side of the film. In fact, as shown in FIGS. 10A-10D, 2D spherulite formation is observed on the side of the film that was in contact with the meniscus. In the silanated case, the SWCNT alignment extends to both sides of the film, which is indicative of global alignment. FIGS. 10A-10D provide clear evidence that the 2D spherulite is removed through the silanation process, which leads to a high degree of global alignment.

Figure 11A:
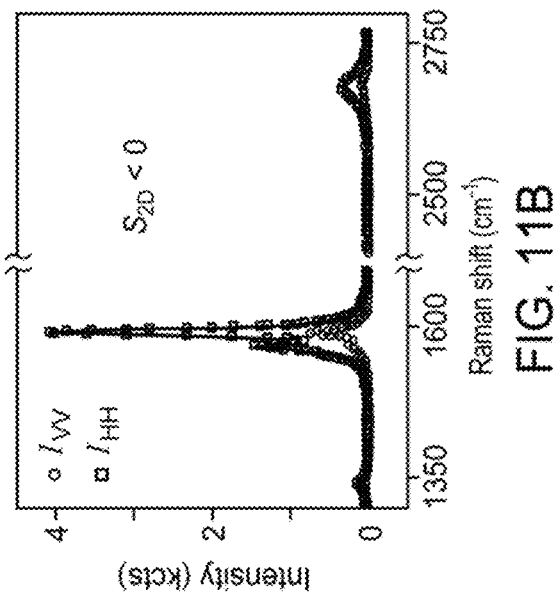
FIG. 11A is an exemplary individual Raman spectra extracted from FIG. 3D showing the differences in regions where $S_{2D}>0$ according to at least one embodiment of the present disclosure.
Figure 11B:
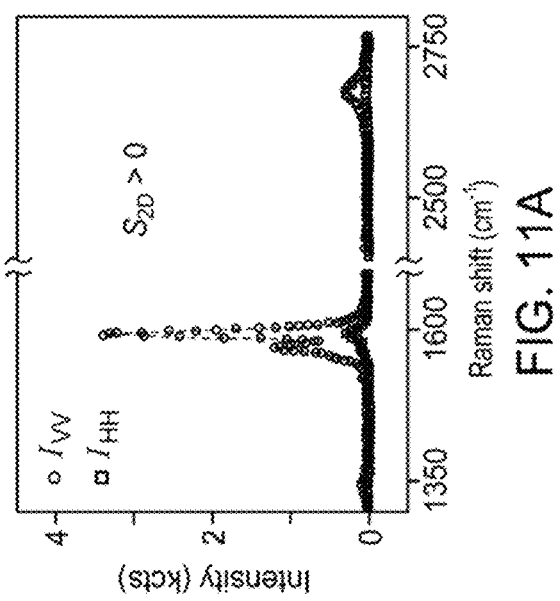
FIG. 11B is an exemplary individual Raman spectra extracted from FIG. 3D showing the differences in regions where $S_{2D}<0$ according to at least one embodiment of the present disclosure.

In FIGS. 11A and 11B, individual spectra are extracted from the 2D mapping data shown in FIG. 3D from both the $I_{VV}$ and $I_{HH}$ regions. The lines are fits to the $G^+$ and $G^-$ features. These spectra clearly demonstrate that the overall nematicity is not constant. In fact, in the $I_{HH}$ regions, the nematicity is nearly perpendicular to that of the nematicity of the $I_{VH}$ sections. The results indicate that using large-area optical techniques can be beneficial for determining global alignment.

Example 10: Membrane Pretreatment

As described above in relation to FIGS. 4A and 4B, the nanoporous membranes used for filtration possess a production-made groove pattern. It was first thought that these grooves may be contributing to the alignment, providing mechanical trenches in which the SWCNTs could fall into and provide the initial aligned layer. However, these trenches are significantly larger than the SWCNTs, suggesting that the mechanical effect of these grooves is smaller than electrostatic forces. To determine whether the grooving had an effect on SWNCT alignment, both a water- and an organic solvent-wetted wipe was swept across the membrane surface along the direction parallel to the production-made grooves shown in FIG. 4A. Illustrative, but non-limiting, examples of the organic solvent can be an alcohol solvent such as ethanol and/or isopropanol.

Figure 12:
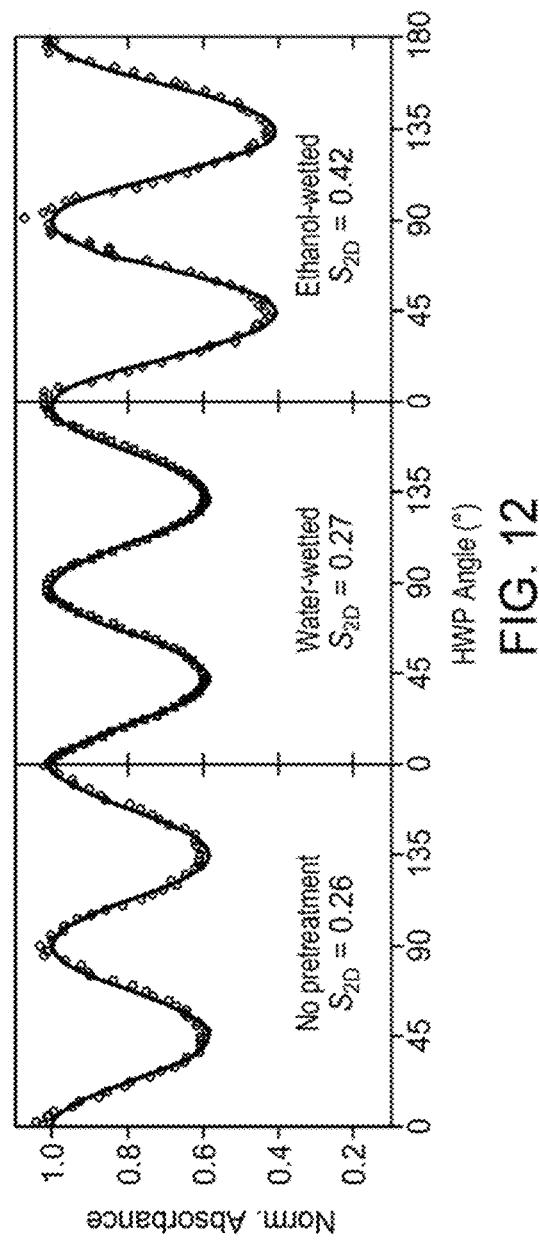
FIG. 12 is exemplary data illustrating the effect on SWCNT alignment of dragging wipes across the membrane surface prior to filtration, according to at least one embodiment of the present disclosure (black lines are fits to the data).

As seen in FIG. 12, despite the same mechanical action, it is when the ethanol-wetted wipe is used that a large increase in $S_{2D}$ is achieved. This observation strongly suggests that preferential electrostatic charging, instead of mechanical grooving, is responsible for SWCNT alignment using this filtration method. With no membrane pretreatment, a low degree of alignment is observed (left panel, FIG. 12). When using a water-wetted wipe membrane treatment (middle panel, FIG. 12), a similar degree of alignment is observed, indicating that the effect of creating an added groove density (larger mechanical impact) to the membrane does not contribute to SWCNT alignment. However, when an ethanol-wetted wipe is dragged across the surface (right panel, FIG. 12), a large increase in the overall alignment of the SWCNT film is observed, indicating that directional tribocharging of the membrane drives the SWCNT alignment.

In summary, embodiments of the present disclosure provide for machine-vision automation and parallelization to simultaneously produce globally-aligned SWCNT films from an aqueous solution using pressure-driven filtration. Feedback control enables filtration to occur with a constant flow rate that not only improves the nematic ordering of the SWCNT films, but also provides the ability to align a wide range of SWCNT types and on a variety of nanoporous membranes using the same filtration parameters. A meniscus of the aqueous solution is flattened via utilization of silanated glassware.

The automated, parallelized SWCNT filtration system can create simultaneous and reproducible SWCNT films with a high degree of true global alignment. Holding the filtration flow rate constant using the pressure-controlled system enhances the nematic order of SWCNT films. In addition, measurement and removal of 2D spherulite formation on the front-surface of the SWCNT films is performed by flattening the meniscus using silanated glassware. It is believed that directional charging on the filter membrane and inter-SWCNT electrostatic interactions are the two driving forces behind the alignment of nanotubes using the disclosed filtration technique. The SWCNT filtration processes described herein, as well as the results described, provide for research and industrial-scale implementation of highly aligned SWCNT films from aqueous solutions.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to embodiments of the present disclosure, other and further embodiments of the disclosure may be devised without departing from the basic scope thereof, and the scope thereof is determined by the claims that follow.

What is claimed is:

1. A process for aligning carbon nanotubes, the process comprising:
  introducing an aqueous solution to a pressure-controlled system, the pressure-controlled system comprising a silanated glass element, a porous membrane, and a container;
  applying a pressure differential across the porous membrane to draw the aqueous solution from the silanated glass element, through the porous membrane, and to the container at a flow rate to form a filtrate disposed within the container and a retentate disposed above the porous membrane, the retentate comprising carbon nanotubes; and
  optically detecting a position of a meniscus of the aqueous solution in the silanated glass element.

2. The process of claim 1, wherein the flow rate is calculated by measuring a change in the position of the meniscus over a period of time.

3. The process of claim 1, further comprising changing a pressure of the pressure-controlled system when the position of the meniscus reaches a threshold value.

4. The process of claim 3, wherein the pressure is changed such that the flow rate remains constant.

5. The process of claim 1, wherein the porous membrane is configured to be porous to a liquid medium of the aqueous solution and impervious to the carbon nanotubes.

6. The process of claim 1, wherein the silanated glass element is configured to have a meniscus-to-glass contact angle of about 80° to about 100°.

7. The process of claim 6, wherein the meniscus-to-glass contact angle is about 85° to about 95°.

8. The process of claim 1, wherein a surface of the porous membrane is contacted with alcohol prior to filtration.

9. The process of claim 1, further comprising:
measuring the flow rate, a height of the meniscus, or a combination thereof;
determining a pressure based on the measured flow rate, the height of the meniscus, or both; and
applying the determined pressure to the pressure-controlled system.

10. The process of claim 9, wherein the determining a pressure is further determined by a resistance of the porous membrane.

11. The process of claim 1, further comprising:
measuring a resistance of the porous membrane and a retentate resistance; and
changing a transmembrane pressure to maintain a constant permeation flux, wherein the transmembrane pressure is a sum of an applied pressure and a head pressure.

12. The process of claim 1, wherein the optically detecting a position of a meniscus comprises:
collecting an image of the meniscus; and
converting the image to a height, a volume, or a combination thereof.

13. The process of claim 1, wherein the process is repeated for a second aqueous solution in a second pressure-controlled system, based on detecting the position of the meniscus of the aqueous solution.

14. A process for forming carbon nanotubes, the process comprising:
introducing a first aqueous solution to a pressure-controlled system, the pressure-controlled system comprising a silanated glass element, a porous membrane, and a container;
applying a pressure to the pressure-controlled system to draw the first aqueous solution from the silanated glass element, through the porous membrane, and to the container at a flow rate to form a filtrate disposed within the container and a retentate disposed above the porous membrane, the retentate comprising carbon nanotubes;
changing the pressure of the pressure-controlled system, comprising:
optically detecting a position of a meniscus of the first aqueous solution in the silanated glass element with an optical device;
measuring the flow rate, a height of the meniscus, or both; and
determining a pressure based on the measured flow rate, the position of the meniscus, or both; and
forming carbon nanotubes on the porous membrane.

15. The process of claim 14, further comprising:
measuring a resistance of the porous membrane;
measuring a retentate resistance; and
changing a transmembrane pressure to maintain a constant permeation flux, wherein the transmembrane pressure is a sum of an applied pressure and a head pressure.

16. The process of claim 14, wherein the optically detecting a position of a meniscus comprises:
collecting an image of the meniscus; and
converting the image to a height, a volume, or a combination thereof.

17. The process of claim 14, wherein the process is repeated for a second aqueous solution in a second pressure-controlled system, based on detecting the position of the meniscus of the first aqueous solution.

18. An apparatus, comprising:
a membrane defining a retentate side and a filtrate side;
a container on the filtrate side of the membrane;
a pressure source coupled to the container; and
a silanated glass element coupled to the container, wherein at least a portion of the silanated glass element is on the filtrate side of the membrane, and wherein the silanated glass element has a meniscus-to-glass contact angle of about 80° to about 100°.

19. The apparatus of claim 18, wherein the meniscus-to-glass contact angle is about 85° to about 95°.

20. The apparatus of claim 18, wherein the membrane is disposed within the silanated glass element and across a diameter of the silanated glass element.

* * * * *